United States Patent
Yoshida et al.

(10) Patent No.: US 11,825,213 B2
(45) Date of Patent: Nov. 21, 2023

(54) REMOVAL OF IMAGE CAPTURE DEVICE FROM OMNIDIRECTIONAL IMAGE CREATED BY STITCHING PARTIAL IMAGES

(71) Applicants: Kazuhiro Yoshida, Kanagawa (JP); Takeshi Watanabe, Kanagawa (JP); Masato Senshu, Tokyo (JP); Hiroshi Kano, Tokyo (JP); Daisuke Hohjoh, Chiba (JP)

(72) Inventors: Kazuhiro Yoshida, Kanagawa (JP); Takeshi Watanabe, Kanagawa (JP); Masato Senshu, Tokyo (JP); Hiroshi Kano, Tokyo (JP); Daisuke Hohjoh, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 60 days.

(21) Appl. No.: 17/614,566

(22) PCT Filed: May 19, 2020

(86) PCT No.: PCT/IB2020/054712
§ 371 (c)(1),
(2) Date: Nov. 29, 2021

(87) PCT Pub. No.: WO2020/254887
PCT Pub. Date: Dec. 24, 2020

(65) Prior Publication Data
US 2022/0224831 A1    Jul. 14, 2022

(30) Foreign Application Priority Data
Jun. 17, 2019  (JP) .................................. 2019-111951

(51) Int. Cl.
*H04N 23/951* (2023.01)
*H04N 23/62* (2023.01)
(Continued)

(52) U.S. Cl.
CPC .......... *H04N 23/951* (2023.01); *H04N 23/62* (2023.01); *H04N 23/667* (2023.01); *H04N 23/67* (2023.01); *H04N 23/698* (2023.01)

(58) Field of Classification Search
CPC .... H04N 23/951; H04N 23/62; H04N 23/667; H04N 23/67; H04N 23/698;
(Continued)

(56) References Cited

U.S. PATENT DOCUMENTS

| 10,051,180 B1 | 8/2018 | Chen |
| 2004/0061802 A1 | 4/2004 | Yoshida |

(Continued)

FOREIGN PATENT DOCUMENTS

| EP | 3054414 A1 | 8/2016 |
| JP | 2016-149736 | 8/2016 |

(Continued)

OTHER PUBLICATIONS

International Search Report dated Aug. 26, 2020 in PCT/IB2020/054712 filed on May 19, 2020, 17 pages.

(Continued)

*Primary Examiner* — Christopher K Peterson
(74) *Attorney, Agent, or Firm* — XSENSUS LLP

(57) ABSTRACT

An image processing system includes a joining processing unit configured to perform a joining process to join input images captured by an image capturing device and generate an output image the image capturing device being reflected in each of the input images; and an acceptance unit configured to receive selection of one of a plurality of modes for the joining process. The plurality of modes has a first mode to generate an output image in which at least a part of the image capturing device is reflected, through the joining process; and a second mode to, through the joining process, generate an output image whose area where the image (Continued)

capturing device is reflected is smaller than an area where the image capturing device is reflected in the output image in the first mode or generate an output image in which the image capturing device is not reflected.

16 Claims, 15 Drawing Sheets

(51) Int. Cl.
  *H04N 23/67* (2023.01)
  *H04N 23/667* (2023.01)
  *H04N 23/698* (2023.01)
(58) Field of Classification Search
  CPC ...... H04N 13/239; H04N 23/45; H04N 23/61; H04N 23/66; H04N 5/2622; G06T 1/0007; G06T 3/0018; G06T 3/4038; G06T 5/008; G06T 5/50
  See application file for complete search history.

(56) References Cited

U.S. PATENT DOCUMENTS

| | | | |
|---|---|---|---|
| 2008/0074535 A1 | 3/2008 | Ohsuga et al. | |
| 2011/0128436 A1 | 6/2011 | Ohsuga et al. | |
| 2012/0013996 A1 | 1/2012 | Okumura | |
| 2012/0086829 A1 | 4/2012 | Hohjoh | |
| 2013/0050516 A1 | 2/2013 | Hojo | |
| 2013/0076936 A1 | 3/2013 | Yoshida | |
| 2013/0114862 A1 | 5/2013 | Hohjoh | |
| 2014/0168357 A1* | 6/2014 | Venable | G03B 37/04 348/38 |
| 2014/0267596 A1 | 9/2014 | Geerds | |
| 2014/0347526 A1 | 11/2014 | Hara et al. | |
| 2015/0042847 A1 | 2/2015 | Hohjoh | |
| 2015/0215595 A1 | 7/2015 | Yoshida | |
| 2016/0050369 A1 | 2/2016 | Takenaka et al. | |
| 2016/0156844 A1* | 6/2016 | Ogawa | G06T 3/4038 348/36 |
| 2016/0212336 A1 | 7/2016 | Takenaka et al. | |
| 2016/0212409 A1 | 7/2016 | Cole et al. | |
| 2016/0234438 A1* | 8/2016 | Satoh | G06T 3/0018 |
| 2017/0094169 A1 | 3/2017 | Yoshikawa et al. | |
| 2017/0294045 A1 | 10/2017 | Cabral et al. | |
| 2017/0339392 A1 | 11/2017 | Forutanpour et al. | |
| 2018/0027181 A1 | 1/2018 | Roulet et al. | |
| 2018/0075635 A1 | 3/2018 | Choi et al. | |
| 2018/0182065 A1 | 6/2018 | Yoshida et al. | |
| 2018/0184001 A1 | 6/2018 | Yoshida et al. | |
| 2018/0332221 A1 | 11/2018 | Takenaka et al. | |
| 2019/0191082 A1 | 6/2019 | Uehara et al. | |
| 2019/0297242 A1 | 9/2019 | Terauchi et al. | |
| 2019/0340737 A1 | 11/2019 | Kawaguchi et al. | |
| 2019/0347766 A1 | 11/2019 | Kawaguchi et al. | |
| 2019/0347775 A1 | 11/2019 | Suitoh et al. | |
| 2020/0007763 A1 | 1/2020 | Takenaka et al. | |
| 2020/0244879 A1 | 7/2020 | Hohjoh | |

FOREIGN PATENT DOCUMENTS

| | | |
|---|---|---|
| JP | 2018-169601 A | 11/2018 |
| JP | 2020-123172 | 8/2020 |
| WO | WO2018/025825 A1 | 2/2018 |

OTHER PUBLICATIONS

Office Action dated Mar. 7, 2023 in Japanese Patent Application No. 2019-111951, 7 pages.

* cited by examiner

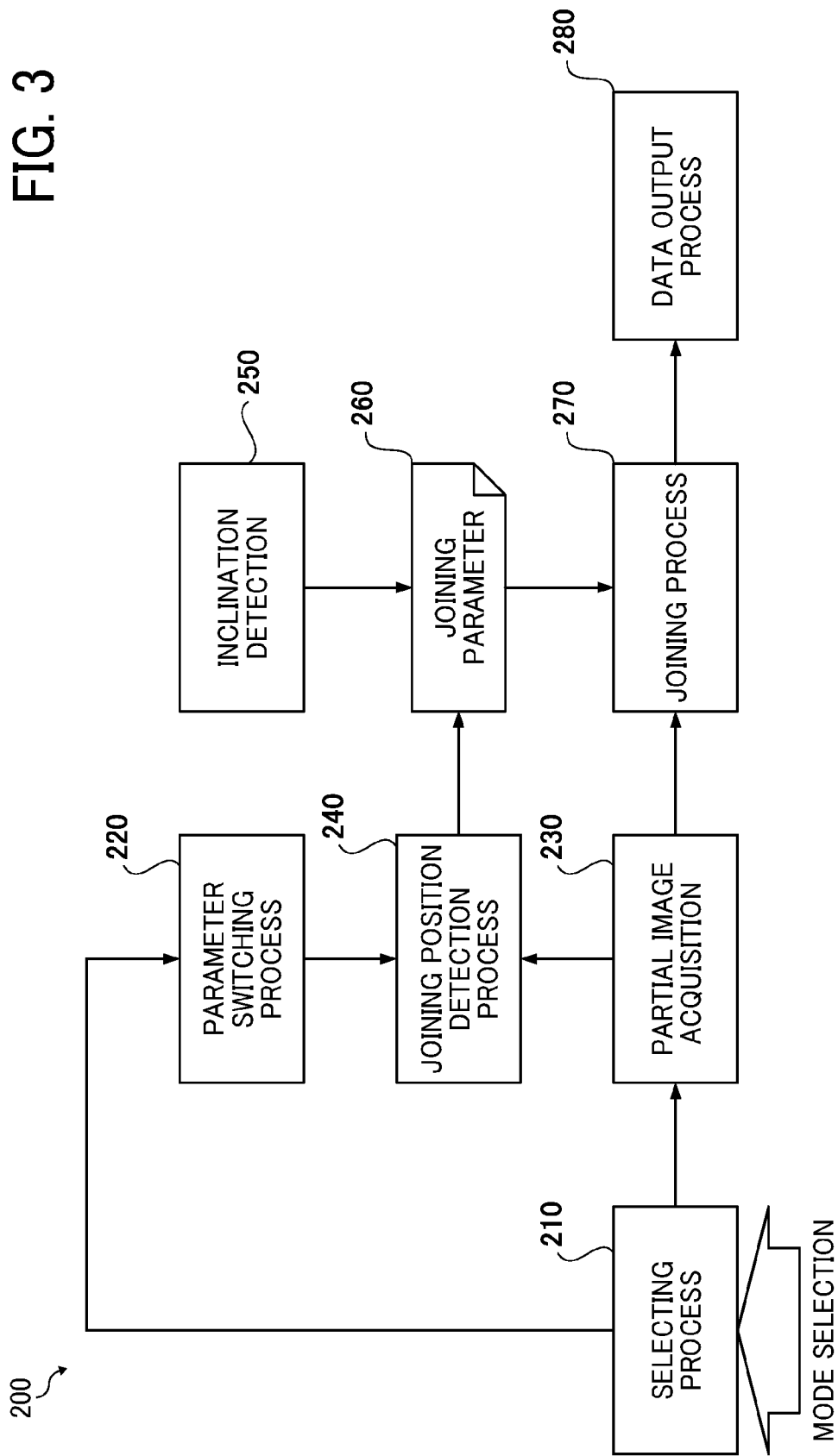

| COORDINATE VALUES AFTER TRANSFORMATION | | COORDINATE VALUES BEFORE TRANSFORMATION | |
|---|---|---|---|
| $\theta$ (pix) | $\Phi$ (pix) | x (pix) | y (pix) |
| 0 | 0 | | |
| 1 | 0 | | |
| ... | ... | ... | ... |
| 3598 | 1799 | | |
| 3599 | 1799 | | |

FIG. 11

| COORDINATE VALUES AFTER TRANSFORMATION || JOINING POSITION (OFFSET AMOUNT) ||
|---|---|---|---|
| θ (pix) | Φ (pix) | Δθ (pix) | ΔΦ (pix) |
| 0 | 0 | | |
| 1 | 0 | | |
| ... | ... | ... | ... |
| 3598 | 1799 | | |
| 3599 | 1799 | | |

CAPTURED PORTION OF MAIN BODY

REMOVAL OF IMAGE CAPTURE DEVICE FROM OMNIDIRECTIONAL IMAGE CREATED BY STITCHING PARTIAL IMAGES

CROSS-REFERENCE TO RELATED APPLICATIONS

The present application is based on PCT filing PCT/IB2020/054712, filed May 19, 2020, which claims priority to Japanese Patent Application No. 2019-111951, filed on Jun. 17, 2019, the entire contents of each are incorporated herein by its reference.

TECHNICAL FIELD

The present disclosure relates to an image processing system, an image capturing system, an image processing device, an image capturing device, and recording medium.

BACKGROUND ART

Conventionally, an omnidirectional image capturing apparatus captures images using a plurality of fish-eye lenses or wide-angle lenses, performs distortion correction and projective transformation on the obtained images, and joins partial images captured by the lenses so as to form one omnidirectional image. In the process of joining the images, the positions where subjects overlap with each other in the overlapping areas of partial-view images are detected using pattern matching or the like.

In such an omnidirectional image capturing device, a subject, such as a photographer and a fixing jig for holding the image capturing device in place, might be undesirably captured and reflected in a captured image due to the characteristics of the omnidirectional image capturing device. If a monopod or the like is used as the fixing jig to hold the image capturing device in place, such an undesired reflection in an image can be substantially prevented.

JP-6514418-B discloses the technique to address the issue that a photographer himself/herself is undesirably reflected in a resultant image. More specifically, JP-6514418-B provides the image capturing system that facilitates the operation of generating a spherical image at a site, such as a facility or a real estate property, and also eliminates an unwanted portion such as an image of, for example, the photographer from the generated spherical image with an easy image processing operation.

The image capturing system of JP-6514418-B includes an image capturing device, a mobile terminal, and a server. The image capturing device generates an image in which a subject is captured in a 360-degree omnidirectional range around the image capturing device by one shooting operation. The mobile terminal incudes the image data acquisition unit that acquires image data of a plurality of images captured plural times by the image capturing device. The position of an object other than the subject relative to the image capturing device differs between the plurality of images. The server is provided with the image processor that combines the plurality of images and generates an image in which the image of the object has been deleted.

However, the technology of JP-6514418-B still has the difficulty in preventing a part of the image capturing device itself from being undesirably reflected in an image.

CITATION LIST

Patent Literature

[PTL 1] JP-6514418-B

SUMMARY OF INVENTION

Technical Problem

The present disclosure is made in light of the above-described situation, and an object of the disclosure is to provide an image processing system capable of substantially preventing the image capturing device from being reflected in an image generated by joining a plurality of input images.

Solution to Problem

In view of the above, there is provided an image processing system including: a joining processing unit configured to perform a joining process to join a plurality of input images captured by an image capturing device and generate an output image the image capturing device being reflected in each of the plurality of input images; and an acceptance unit configured to receive selection of one of a plurality of modes for the joining process. The plurality of modes has a first mode to generate an output image in which at least a part of the image capturing device is reflected, through the joining process, and a second mode to, through the joining process, generate an output image whose area where the image capturing device is reflected is smaller than an area where the image capturing device is reflected in the output image in the first mode or generate an output image in which the image capturing device is not reflected.

Advantageous Effects of Invention

The embodiments of the present disclosure provide an image capturing device itself can be substantially prevented from being reflected in a resultant image generated by joining a plurality of captured and input images.

BRIEF DESCRIPTION OF DRAWINGS

The accompanying drawings are intended to depict example embodiments of the present disclosure and should not be interpreted to limit the scope thereof. The accompanying drawings are not to be considered as drawn to scale unless explicitly noted. Also, identical or similar reference numerals designate identical or similar components throughout the several views.

FIG. 3 is a block diagram of image processing path of a plurality of modes in the spherical-image capturing system according to an embodiment of the present disclosure.

FIG. 11 is a table of a data structure of a joining position detection result according to an embodiment of the present disclosure.

DESCRIPTION OF EMBODIMENTS

Figure 1:
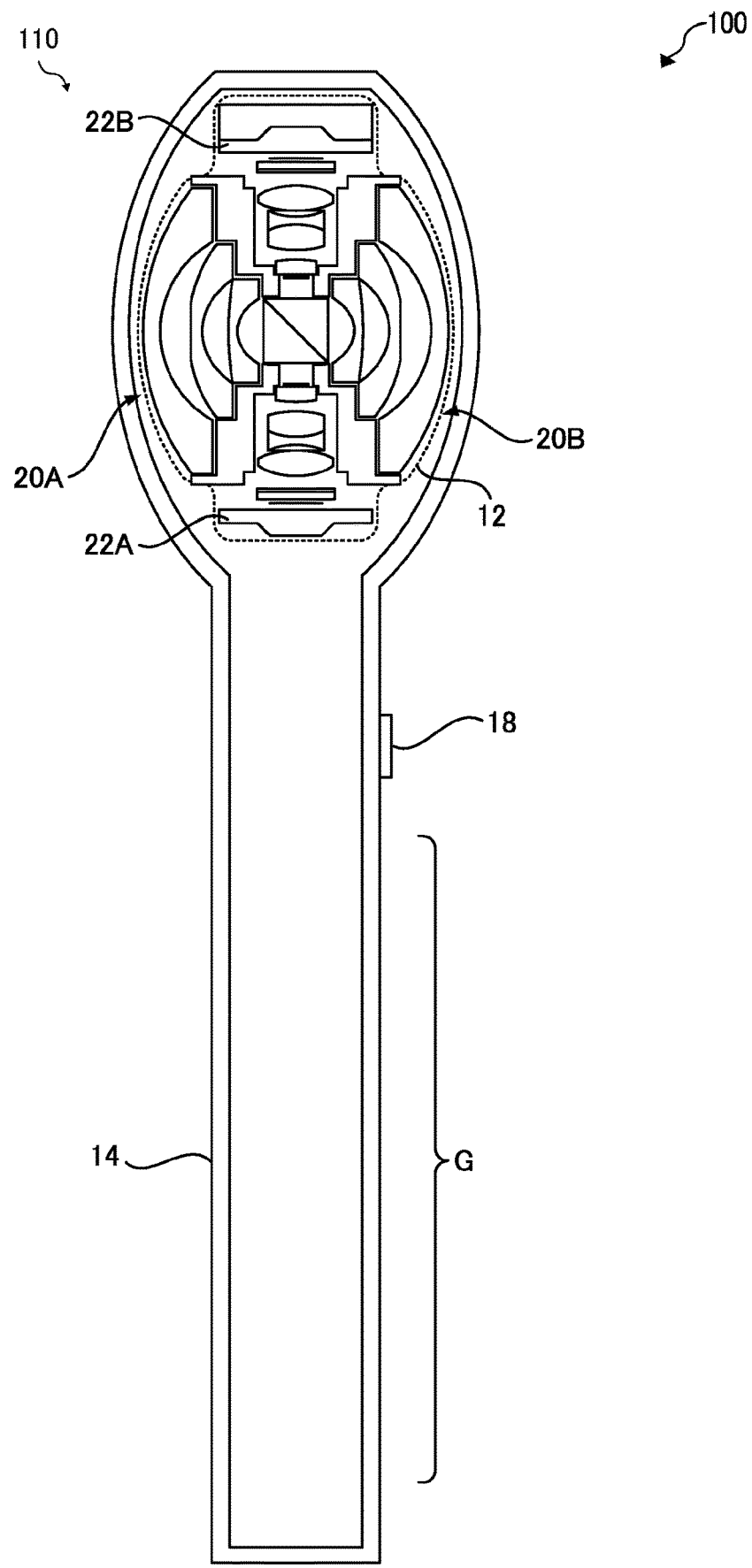
FIG. 1 is a sectional view of a spherical-image camera that constitutes a spherical-image capturing system according to an embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described in detail referring to the drawings. Like reference signs are applied to identical or corresponding components throughout the drawings and redundant description thereof may be omitted.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the embodiments described below, as an example of an image processing system and an image capturing system, a spherical-image capturing system 100 including: a spherical-image camera 110 provided with two fish-eye lenses; and a user terminal device 150 communicably connected with the spherical-image camera 110 is described. In the embodiments described below, the number of the fish-eye lenses is two, but three or more fish-eye lenses may be used. Further, the fish-eye lens may be a wide-angle lens or a super-wide-angle lens. Hereinafter, the schematic configuration of the spherical-image capturing system 100 according to the present embodiment is described with reference to FIG. 1, FIG. 2A, and FIG. 2B. FIG. 1 is a sectional view of the spherical-image camera 110 that constitutes the spherical-image capturing system 100 according to the present embodiment. The spherical-image camera 110 in FIG. 1 includes an imaging body 12, a casing 14 that holds the imaging body 12 and components such as a control board and a battery, and a shooting button 18 provided on the casing 14. The spherical-image camera 110 in FIG. 1 has a vertically long shape and includes a grip portion G, which is used for a user to grip the spherical-image camera 110, near the lower part of the casing 14 where the shooting button 18 is provided. The imaging body 12 in FIG. 1 includes two image-forming optical systems 20A and 20B and two image sensors 22A and 22B. Examples of the image sensors 22A and 22B include charge-coupled devices (CCDs) and complementary metal oxide semiconductors (CMOSs). The image-forming optical systems 20A and 20B are hereinafter sometimes referred to collectively as an image-forming optical system 20. The image sensors 22A and 22B are hereinafter sometimes referred to collectively as an image sensor 22. Each of the image-forming optical systems 20 is configured as a fish-eye lens consisting of, for example, seven elements in six groups. In the embodiment illustrated in FIG. 1, the above-mentioned fish-eye lens has a full angle of view of larger than 180 degrees (=360 degrees/n, where n denotes the number of optical systems and n is 2), preferably has an angle of view of 190 degrees or larger. One of such wide-angle image-forming optical systems 20 (20A and 20B) is combined with one of the image sensors 22 (22A and 22B) to constitute a wide-angle imaging optical system (20 and 22).

The relative position of the optical elements (lenses, prisms, filters, and aperture stops) of the two image-forming optical systems 20A and 20B are defined with reference to the image sensors 22A and 22B. More specifically, positioning is made such that the optical axis of the optical elements of each of the image-forming optical systems 20A and 20B is positioned at the central part of the light receiving area of corresponding one of the image sensors 22 orthogonally to the light receiving area, and such that the light receiving area serves as the imaging plane of corresponding one of the fish-eye lenses.

Figure 2A:
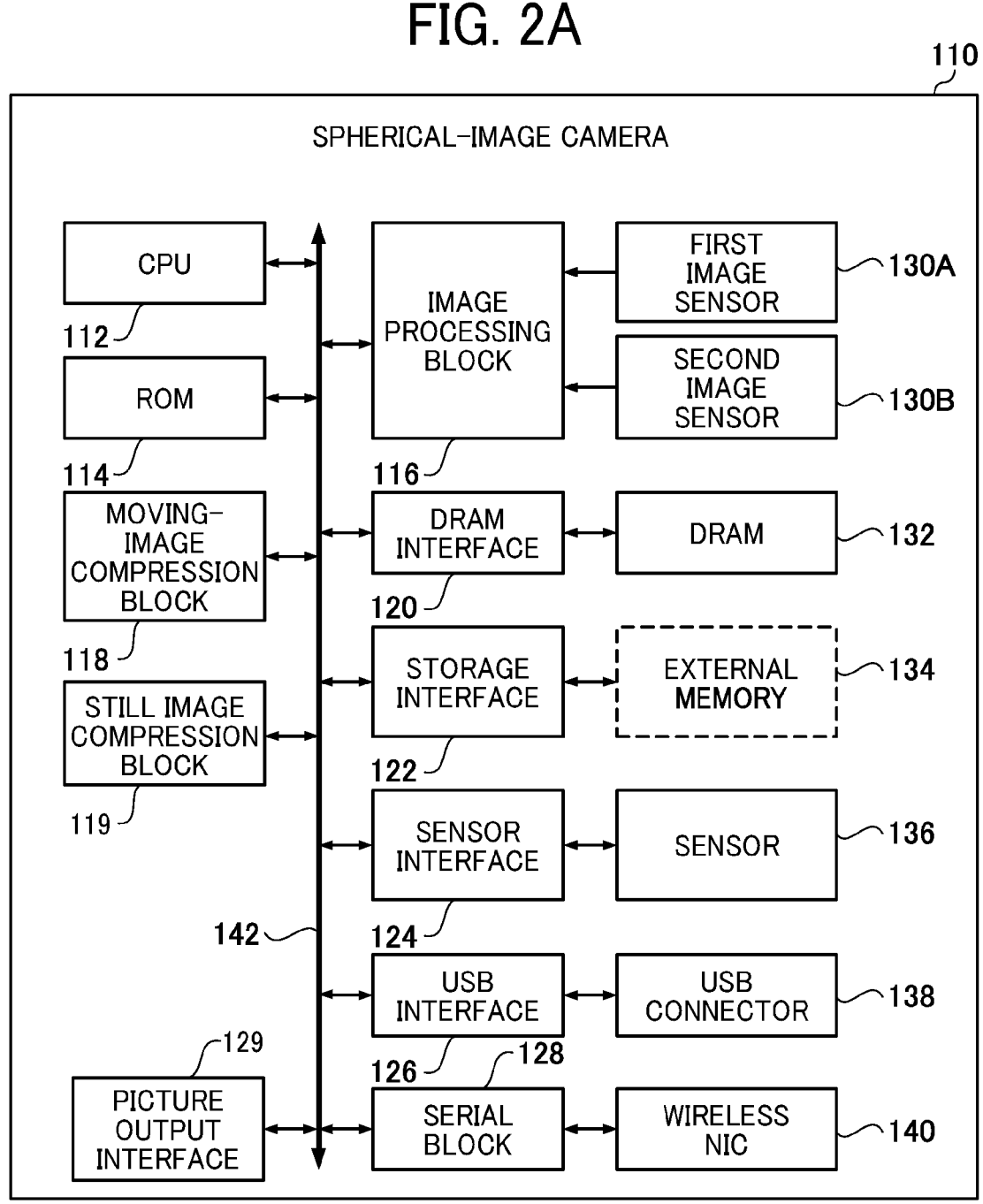
FIGS. 2A and 2B (FIG. 2) are block diagrams of the hardware configuration of a spherical-image capturing system according to an embodiment of the present disclosure.

In the embodiment illustrated in FIG. 1, the image-forming optical systems 20A and 20B have the same specification, and are combined facing the opposite directions such that the optical axes thereof match with each other. The image sensors 22A and 22B convert the light distribution of the received light into an image signal, and sequentially output image frames to the image processing block of the control board. As will be described later in detail, the images captured by the respective image sensors 22A and 22B are combined to generate an image over a solid angle of 4πsteradian (hereinafter, such an image is referred to as a "spherical image"). The spherical image is an image of all the directions that can be seen from an image capturing point. While it is assumed in the example embodiment described below that a spherical image is to be generated, a so-called panoramic image obtained by photographing 360 degrees only in a horizontal plane or an image that is a part of the image obtained by photographing omnidirectionally or 360 degrees in a horizontal plane may also be generated. The spherical image may be stored as a still image or as moving images. FIG. 2A is a block diagram of the hardware configuration of a spherical-image capturing system 100 of a spherical-image capturing system 100 according to the present embodiment. The spherical-image camera 110 includes a central processing unit (CPU) 112 (a first CPU), a read only memory (ROM) 114, an image processing block 116, a moving image compression block 118, a still image compression block 119, a dynamic random access memory (DRAM) 132 that is connected thereto through a DRAM interface 120, and a sensor 136 that is connected thereto through an sensor interface 124.

The CPU 112 controls the entire operations of the spherical-image camera 110. The ROM 114 stores therein a control program described in a code readable by the CPU 112 and various kinds of parameters. The image processing block 116 is connected to a first image sensor 130A and a second image sensor 130B (corresponding to the image sensors 22A and 22B in FIG. 1, respectively), and receives image signals of images captured by the image sensors 130A and 130B. The image processing block 116 includes, for example, an image signal processor (ISP), and applies, for example, shading correction, Bayer interpolation, white balance correction, and gamma correction to the image signals received from the image sensors 130A and 130B. Further, the image processing block 116 combines a plurality of images obtained from the image sensors 130A and 130B to generate a spherical image as described above.

The moving image compressing block 118 is a codec block for compressing and expanding a video such as that in moving picture experts group (MPEG)-4 advanced video coding (AVC)/H.264 format. The moving image compressing block 118 is used to generate the video data of the generated spherical image. The still image compression block 119 is a codec block for compressing and expanding a still image in a form of joint photographic experts group (JPEG) or tagged image file format (TIFF). The still image compressing block 119 is used to generate still image data of the generated spherical image. The DRAM 132 provides a storage area for temporarily storing data therein when various types of signal processing and image processing are applied. The sensor 136 detects acceleration components of three axes, and the detected acceleration components are used for detecting the vertical direction to apply zenith correction to the spherical image.

The spherical-image camera 110 further includes a storage interface 122, a universal serial bus (USB) interface 126, a serial block 128, and a video output interface 129. The storage interface 122 is connected to the external memory 134. The storage interface 122 controls reading and writing of data from and to the external memory 134, such as a memory card inserted in a memory card slot.

The USB interface 126 is connected to a USB connector 138. The USB interface 126 controls USB communication with an external device such as a personal computer (PC) connected via the USB connector 138. The serial block 128 controls serial communication with an external device such as a PC, and is connected to a wireless network interface card (NIC) 140. The video output interface 129 is an interface to connect to an external display such as a high-definition multimedia interface (HDMI, registered trademark), and can output the captured images to such an external display as a video. The wireless communication may be a mobile communication system such as 3 generation (G) or 4G, or may be 5G that is a fifth generation mobile communication system. The 5G communication system is superior to 4G in high speed, large capacity, low delay, and the like, and is advantageous in the transmission of image data from the spherical-image camera 110 to an external device.

When the power is turned on by the operation of a power switch, the control program mentioned above is loaded into the main memory. The CPU 112 follows the program read into the main memory to control the operations of the parts of the device, and temporarily stores the data required for the control in the memory. Through this operation, the CPU 112 controls the spherical-image camera 110 to implement various types of function or perform various types of operation as will be described later.

Figure 2B:
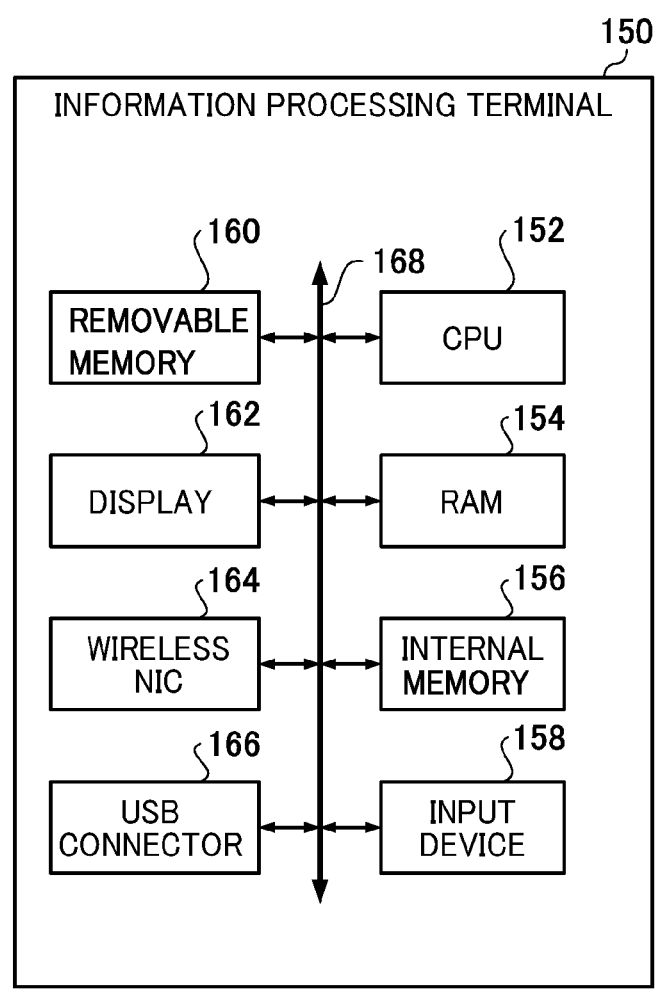

FIG. 2B is a block diagram of the hardware configuration of a user terminal device 150 of the spherical-image capturing system 100 according to the present embodiment. The user terminal device 150 in FIG. 2B includes a CPU 152, a RAM 154, an internal memory 156 (hard disk drive (HDD)), an input device 158, a removable memory 160, a display 162, a wireless NIC 164, and a USB connector 166. The internal memory (HDD) 156 may be changed as appropriate to a storage medium such as a solid state disk (SSD). The user terminal device 150 is assumed to be a personal information terminal (PDA) such as a personal computer (PC), a smartphone, or a tablet terminal.

The CPU 152 controls entire operations of components of the user terminal device 150. The RAM 154 provides the work area of the CPU 152. The internal memory 156 stores therein an operating system and a control program, such as an application, that executes processes in the user terminal device 150 according to the present embodiment, each of the operating system and the control program being written in a code decodable by the CPU 152.

The input devices 158 are input devices, such as a mouse, a keyboard, a touchpad, and a touchscreen, and provide a user interface. The removable memory 160 is a removable recording medium such as a memory card mounted, for example, in a memory card slot, and records various types of data, such as image data in a video format and still image data. The wireless NIC 164 provides a wireless local area network (LAN) communication connection with an external device such as the spherical-image camera 110. The USB connector 166 provides a USB-based connection to an external device such as the spherical-image camera 110. The wireless NIC 164 and the USB connector 166 are only one example, and limitation to any specific standard is not intended. The connection to an external device may be established through another wireless connection such as Bluetooth (registered trademark) and wireless USB or through a wired connection such as wired LAN. The wireless communication may be a 3G, 4G, 5G, or other mobile communication system as described above.

The display 162 displays an operation screen for the user to operate, displays a monitor image of an image captured by the spherical-image camera 110 before or during shooting, and displays a moving image or still image stored for playback or viewing. The display 162 and the input device 158 enable a user to make instructions for image capturing or changing various kinds of settings in the spherical-image camera 110 through the operation screen.

When power is supplied to the user terminal device 150 and the power thereof is turned on, the program is read from a ROM or the internal memory 156, and loaded into the RAM 154. The CPU 152 follows the program read into the RAM 154 to control the operations of the parts of the device, and temporarily stores the data required for the control in the memory.

Through this operation, the CPU 112 controls the user terminal device 150 to implement various types of function or perform various types of operation as will be described later.

As described above, the spherical image captured by the spherical-image camera 110 according to the present embodiment is an image of all the directions that can be seen from an image capturing point. In all the directions, a photographer who performs shooting using the spherical-image camera 110, a fixing jig for holding the spherical-image camera 110 in place, and the spherical-image camera 110 itself (for example, a part of the casing 14) might be included.

An undesired capture of the photographer in an image can be prevented by the photographer moving the blind spot (for example, behind the subject) of the spherical-image camera 110 or by shifting the shooting timing between the two fish-eye lenses so that the photographer can move to the blind spot during the time between the shooting timings. When the photographer himself/herself is desired as a subject and the fixing jig is not desired to be captured, by using a monopod or the like as the fixing jig, such an undesired capture of the fixing jig can be substantially prevented.

However, it is difficult to prevent a part of the casing 14 of the spherical-image camera 110 itself from being undesirably captured in an image. Unlike the photographer, the casing 14 of the spherical-image camera 110 is not typically desired as a subject. When viewing a spherical image, in which the image capturing device itself is undesirably captured and reflected, using a head mounted display (HMD) or the like, the user might lose the sense of immersion. In order to avoid such a situation, there is a demand for preventing such an undesired reflection of the casing 14 of spherical-image camera 110 in a spherical image so as to obtain a spherical image in which the casing 14 of the spherical-image camera 110 is not included.

In view of such circumstances, in the present embodiment, several image processing paths according to multiple modes are prepared to deal with the undesired reflection of the casing 14 of the spherical-image camera 110 in a spherical image. The multiple modes have a first mode and a second mode. The first mode is a main-body displaying mode in which the natural looking of a joint or seam of captured images is prioritized while allowing the casing 14 to be partly reflected in a spherical image generated in the end. The second mode is a main-body hiding mode in which a higher priority is given to preventing the casing 14 from being reflected in a spherical image while allowing an unnatural looking of the joint of captured images (combined images), particularly of the joint portion at an area where a part of the casing 14 is possibly reflected in the first mode and a surrounding area of the area where a part of the casing 14 is possibly reflected in the first mode. It is desired that the spherical-image camera 110 receives a selection of the mode manually or automatically output from a user, and is configured to change the joining process to be performed on the area where a part of the casing 14 of the spherical-image camera 110 is reflected in, according to the received mode.

In this configuration, a user selects the second mode (the main-body hiding mode) when the casing is desired not to be reflected in an image as much as possible. By selecting the second mode, the joining process is performed to obtain as natural looking as possible at an area away from the area where a part of the casing 14 is possibly reflected while preventing a part of the casing 14 from being reflected in a spherical image. Thus, the area where the image capturing device itself is reflected in a spherical image is minimized or eliminated.

Hereinafter, the flow of the image processing operation of the spherical-image capturing system 100 according to each mode is described with reference to FIG. 3. FIG. 3 is an illustration for describing the image processing paths according to the plural modes performed by the spherical-image capturing system 100 according to the present embodiment.

FIG. 3 indicates the flows of the image processing operations of the first mode (the main-body displaying mode) and the second mode (the main-body hiding mode), respectively. In both of the first mode and the second mode, the image processing operation 200 starts from the mode selection process 210. Then, in the partial-view image acquisition process 230, the spherical-image camera 110 controls the two image sensors 130A and 130B to sequentially capture continuous frames. Each of the images captured by the image sensors 130A and 130B is a fish-eye image that roughly covers a hemisphere of the whole sphere as a field of view, configuring a partial-view image of the spherical image. Hereinafter, each frame of the images captured by the image sensors 130A and 130B is referred to as a partial-view image.

In the selection process 210, the spherical-image camera 110 receives a selection of the mode output from a user and sets a process according to the mode selected by the user. The mode selection is made by the user's selecting between the first mode (the main-body displaying mode) and the second mode (the main-body hiding mode). Next, in the parameter switching process 220, the spherical-image camera 110 switches (selects) a parameter to be used in the joining position detection process 240 according to the selected mode.

In the joining position detection process 240, the spherical-image camera 110 detects a joining position between two partial-view images acquired in the partial-view image acquisition process 230, using the parameter selected in the parameter switching process 220. More specifically, in the joining position detection process 240, the spherical-image camera 110 detects, for each frame, the amount of shift of each of a plurality of corresponding points in an overlapping area of the plurality of partial-view images, and thus generates the joining-position detection result.

Subsequent to or in parallel with the joining position detection process 240, the inclination detection process 250 is performed. In the inclination detection process 250, the spherical-image camera 110 controls the sensor 136 illustrated in FIG. 2A to detect the inclination of the spherical-image camera 110 relative to a prescribed reference direction. Typically, the prescribed reference direction refers to a vertical direction in which the acceleration of gravity is applied. In the inclination detection process 250, for each frame, the sensor 136 measures the acceleration components along three axes, and an inclination detection result is generated.

The joining-position detection result and the inclination detection result as described above that are obtained in the joining position detection process 240 and the inclination detection process 250, respectively, configure a joining parameter 260 for combining a plurality of partial-view images for each frame.

Based on the obtained joining parameter 260 obtained, the spherical-image camera 110 subsequently performs a joining process 270 to join two partial-view images obtained in the partial-view image acquisition process 230. In the joining process 270, a plurality of partial-view images (input images) is aligned at the joining positions that are based on the joining-position detection result, and zenith correction is performed based on the inclination detection result. Accordingly, the two partial-view images obtained in the partial-view image acquisition process 230 are combined with each other to generate a spherical image. However, no limitation is indicated thereby, and three or more fish-eye lenses may be used to combine three or more partial-view images to generate a spherical image.

The joining position and the inclination are detected for each frame, and thus the joining parameter 260 is dynamically updated for each frame. Then, the joining process 270 is performed for each frame in view of the joining parameter 260 into which the detection results are incorporated. Accordingly, even when the inclination or direction of the spherical-image camera 110 changes or the subject near the overlapping area moves during the shooting, an output image in which zenith correction and joining-position correction have appropriately been made can be generated.

After the joining process 270 is completed, the spherical-image camera 110 performs the data output process 280 to sequentially store frames in the storage medium of the spherical-image camera 110, and transmit data from the spherical-image camera 110 to the user terminal device 150. Then, the user terminal device 150 performs monitor display based on the output image.

In other words, the user terminal device 150 displays the data output from the spherical-image camera 110 on the monitor. In this case, the spherical image as is may be displayed on the monitor, or an image that is generated by projecting a spherical image with a prescribed angle of view (i.e., an image extracted from a spherical image with a prescribed angle of view) may be displayed.

The spherical image capturing system 100 according to the present embodiment is described in more detail below with reference to FIGS. 4 to 14A, 14B, and 14C.

Figure 4:
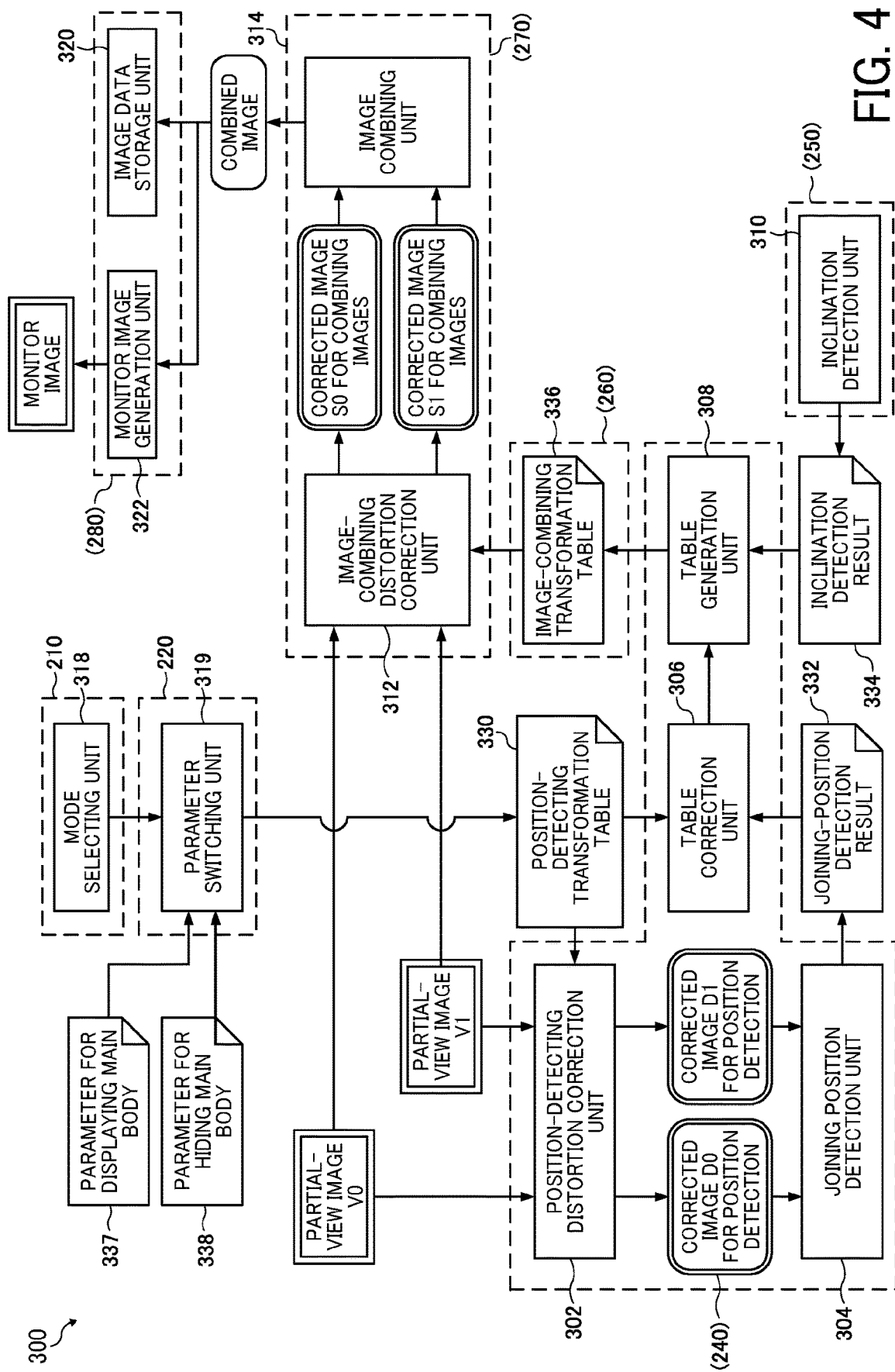
FIG. 4 is a functional block of the spherical-image combining capability implemented at a plurality of modes on the spherical-image capturing system according to an embodiment of the present disclosure.

FIG. 4 is a functional block of the spherical-image combining capability according to each of the multiple modes implemented on the spherical-image capturing system 100 according to the present embodiment. As illustrated in FIG. 4, the image processing block 300 according to the present embodiment includes a position-detecting distortion correction unit 302, a joining position detection unit 304 as a detection processing unit, a table correction unit 306, a table generation unit 308, an inclination detection unit 310, an image-combining distortion correction unit 312, an image combining unit 314, a mode selection unit 318, a parameter switching unit 319, an image data storing unit 320, and a monitor-image generation unit 322.

To the image processing block 300, two partial-view images that have gone through various kinds of image signal processing are input from the two image sensors 130A and 130B for each frame. The image frame derived from the image sensor 130A as a source is referred to as a "partial-view image V0", and the image frame derived from the image sensor 130B as a source is referred to as a "partial-view image V1". In the image processing block 300, a position-detecting transformation table 330 is further provided that is generated in advance by the manufacturer or the like according to a prescribed projection model and the design data or the like of each of the lens optical systems.

The position-detecting distortion correction unit 302 corrects the distortion of the input partial-view images V0 and V1 using the position-detecting transformation table 330, and generates a corrected image for position detection (hereinafter, such an image may be referred to simply as a corrected image C1 and a corrected image C1 for position detection. The input partial-view images V0 and V1 are image data expressed by the planar coordinate system (x, y). By contrast, the corrected images where the distortion is corrected using the position-detecting transformation table 330 is image data in a spherical image format expressed by a spherical coordinate system (i.e., a polar coordinate system having the radius vector of 1 and two angles of deviation θ and φ).

Figure 5A:
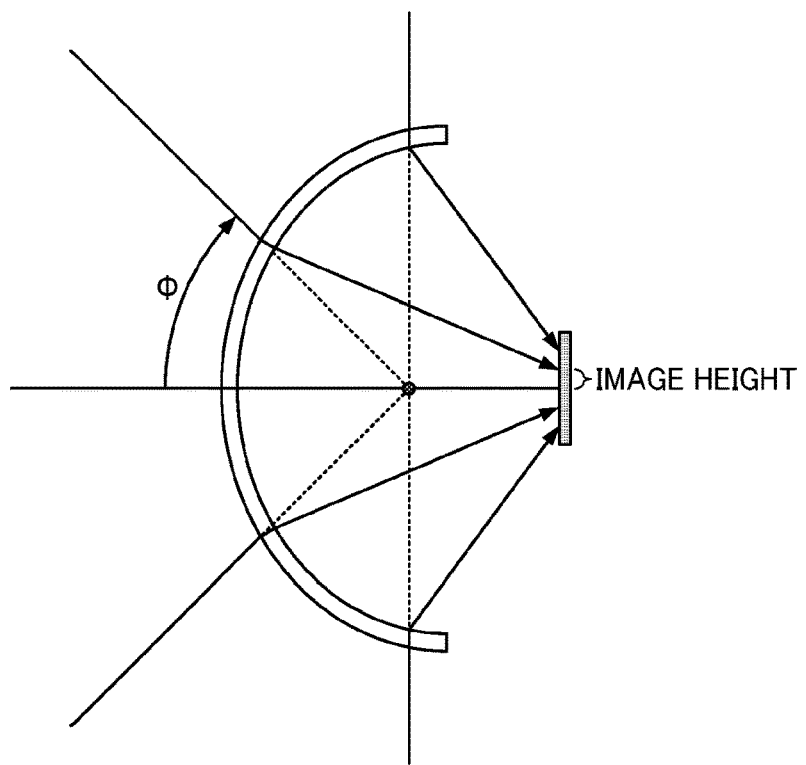
FIGS. 5A and 5B (FIG. 5) are illustrations of a projection relation in the spherical-image capturing system according to an embodiment of the present disclosure.
Figure 5B:
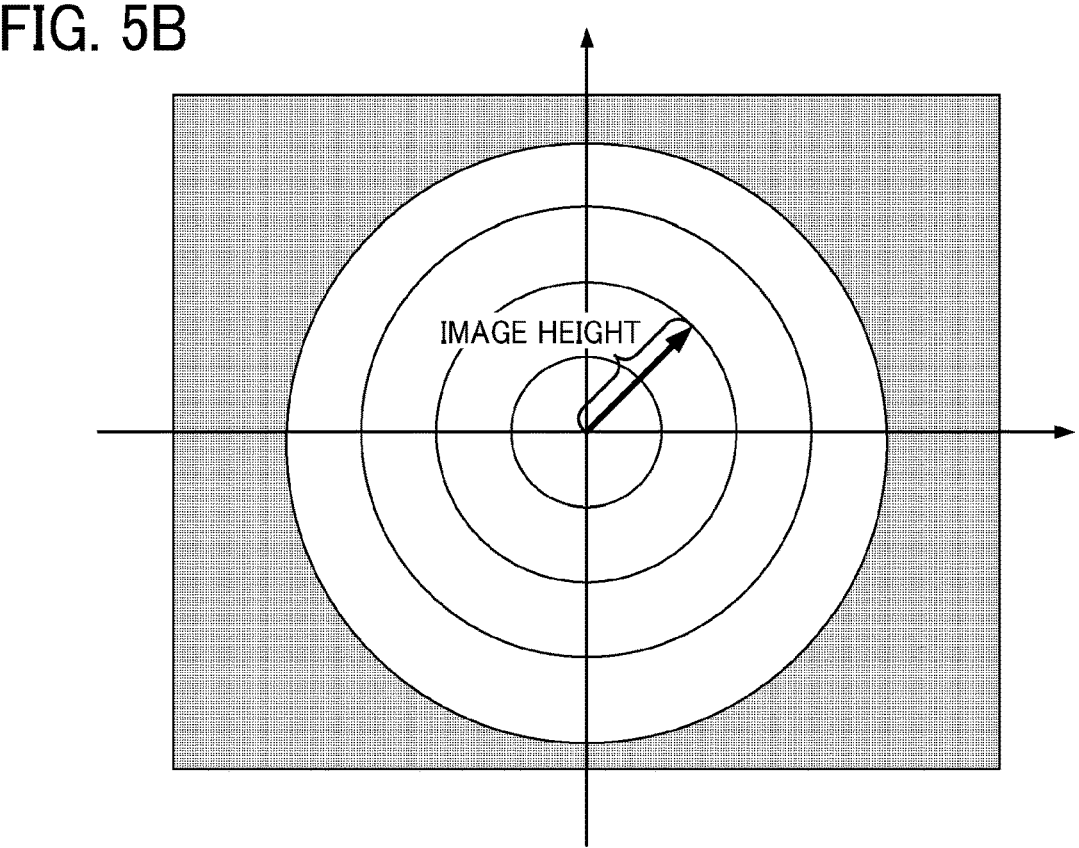

FIGS. 5A and 5B are illustrations of a projection relation in the spherical-image capturing system 100 according to an embodiment of the present disclosure. In the present embodiment, an image captured by one fish-eye lens is an image obtained by capturing an orientation range of substantially a hemisphere with reference to a shooting location. As illustrated in FIG. 5A, the fish-eye lens generates an image having an image height h that corresponds to an angle of incidence φ with reference to the optical axis. The relation between the image height h and the angle of incidence φ is determined by a projection function according to a prescribed projection model. In the present embodiment, the configuration of a so-called circular fish-eye lens that has an image circle diameter shorter than a diagonal line of the image is adopted. As illustrated in FIG. 5B, the partial-view image obtained from the lens is a planar image including the entire image circle obtained by projecting the captured range of substantially a hemisphere.

Figure 6A:
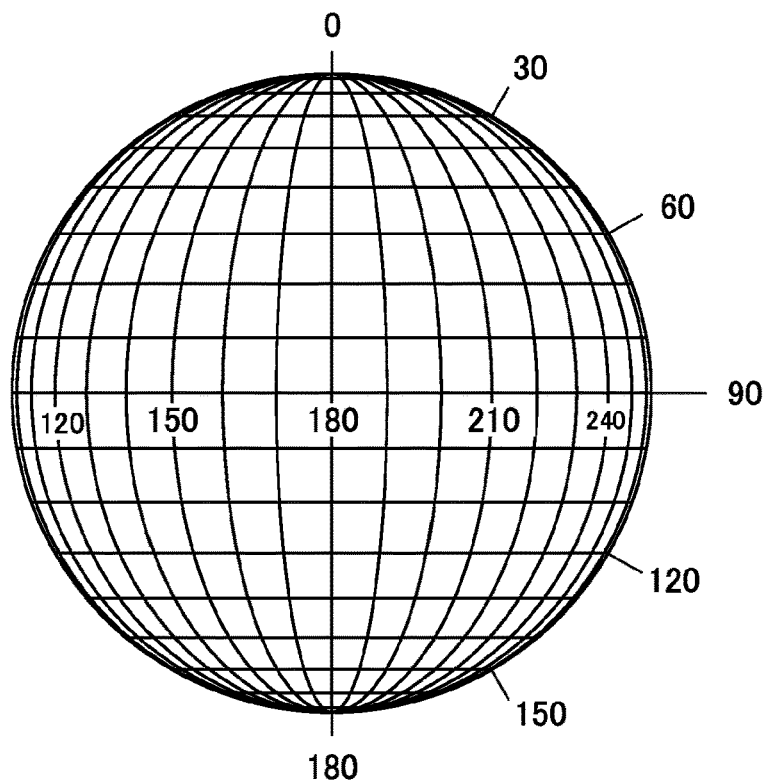
FIGS. 6A and 6B (FIG. 6) are illustrations of the data structure of image data in a spherical image format, according to an embodiment of the present disclosure.
Figure 6B:
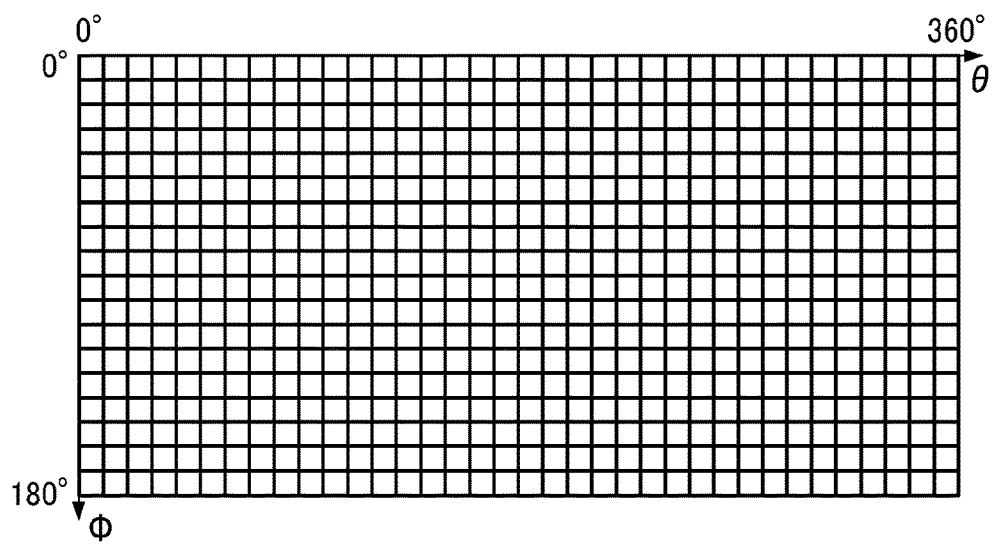

FIGS. 6A and 6B are illustrations of the data structure of image data in a spherical image format, according to an embodiment of the present disclosure. As illustrated in FIG. 6A and FIG. 6B, the image data in a spherical image format is expressed as an array of pixel values in the coordinates defined by the vertical angle φ corresponding to an angle with reference to the axis and the horizontal angle θ corresponding to an angle of rotation around the axis. The respective coordinate values (θ, φ) are associated with the points on the spherical surface representing all directions from the shooting position. Thus, the all directions are mapped on the spherical image.

Figures 7A, 7B:
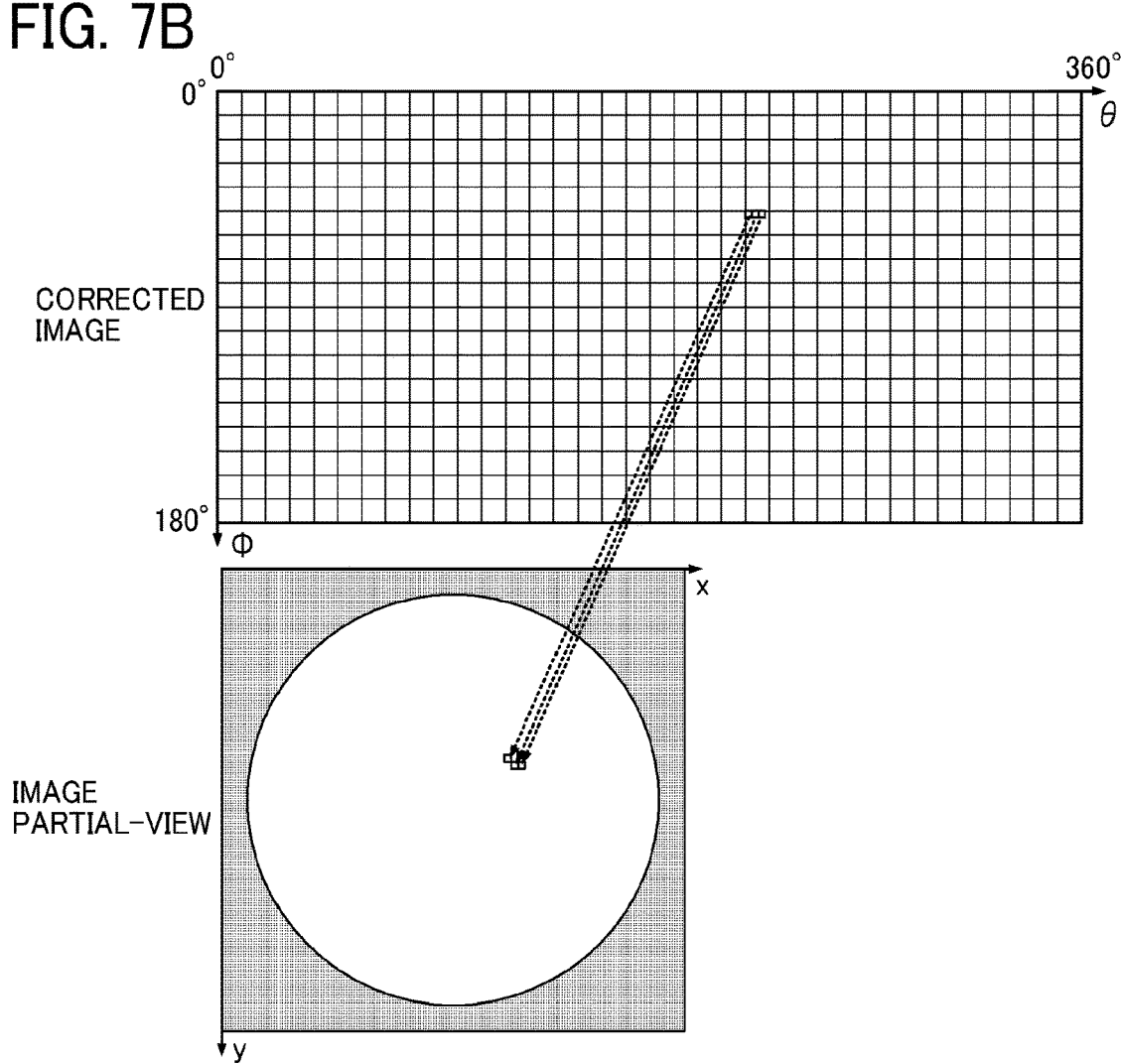
FIGS. 7A and 7B (FIG. 7) are illustrations of the transformation data that a position-detecting distortion correction unit and an image-combining distortion correction unit refers to, according to an embodiment of the present disclosure.

FIG. 7A and FIG. 7B are diagrams illustrating the transformation data that the position-detecting distortion correction unit 302 refers to, according to the present embodiment. The transformation table 330 provides for the projection of partial-view images expressed in a planar coordinate system as an image expressed in a spherical coordinate system. As illustrated in FIG. 7A and FIG. 7B, for each fish-eye lens, the transformation table 330 provides for the associating information between the coordinate values (θ, φ) of the post-correction images and the coordinate values (x, y) of the pre-correction partial-view images that are mapped on the coordinate values (θ, φ), for all the coordinate values (θ, φ). In the illustration of FIG. 7A and FIG. 7B, the angle of each one of the pixels is one-tenths of a degree in both φ direction and θ direction, and the transformation table includes the data indicating the 3600×1800 corresponding relation for each fish-eye lens. The position-detecting transformation table 330 that is used for the joining position detection is created by calculating and tabulating the value upon correcting the distortion from an optimal lens model in advance by a manufacturer or the like.

The mode selection unit 318 receives the mode selected by the user, and the parameter switching unit 319 switches the parameter according to the mode received by the mode selection unit 318. The mode selection by the user is made, for example, through a softkey on the application that operates on the user terminal device 150, or through a hard key of the spherical-image camera 110, or through a user interface (UI), such as a remotely controller, communicably connected with the spherical-image camera 110. In the embodiment to be described, the user selects between the main-body displaying mode and the main-body hiding mode. In the present embodiment, the mode selection unit 318 includes an acceptance unit that receives a mode selected by the user, and an identifying unit that identifies the received mode selected by the user.

In the embodiment described below, two modes of the main-body displaying mode and the main-body hiding mode are described as an example. This is only one example. However, the names of these modes to be presented to the user may be any other names. In addition, each of the main-body displaying mode and the main-body hiding mode may be incorporated into another different mode.

The mode switching timing is basically a timing at which the mode selection unit 318 receives a mode selected by the user before the start of shooting. When the mode is changed by the user, the mode is switched in the next shooting to perform the shooting. Under the certain shooting conditions, for example, during the shooting using the method of capturing continuous still images, such as interval shooting or time-lapse shooting, even if the mode is changed by the user during the shooting, it is desired that the mode be fixed and not be changed until the shooting ends. This is because if the joining process changes for each image, the size and shape of the subject might change between images.

Next, the parameters 337 and 338 to be switched (selected) by the parameter switching unit 319 are described below. The parameters 337 and 338 are parameters used as the position-detecting transformation table 330. The parameters 337 and 338 are generated in advance by calibration of the spherical-image camera 110 at the time of factory shipment or the like, and are generated at the time of shooting in the previous shooting mode. Parameters that exist at least before the partial-view image is acquired, such as parameters that have been acquired, are used. The parameter switching unit 319 selects between a main-body displaying parameter 337 and a main-body hiding parameter 338 according to the mode received by the mode selection unit 318. Specifically, the parameter switching unit 319 selects the main-body displaying parameter 337 when the main-body displaying mode is selected by the user, and selects the main-body hiding parameter 338 when the main-body hiding mode is selected by the user. The main-body displaying parameter 337 and the main-body hiding parameter 338 differ in parameter with respect to an area where the casing 14 of the spherical-image camera 110 is reflected in the partial-view image.

Figure 8A:
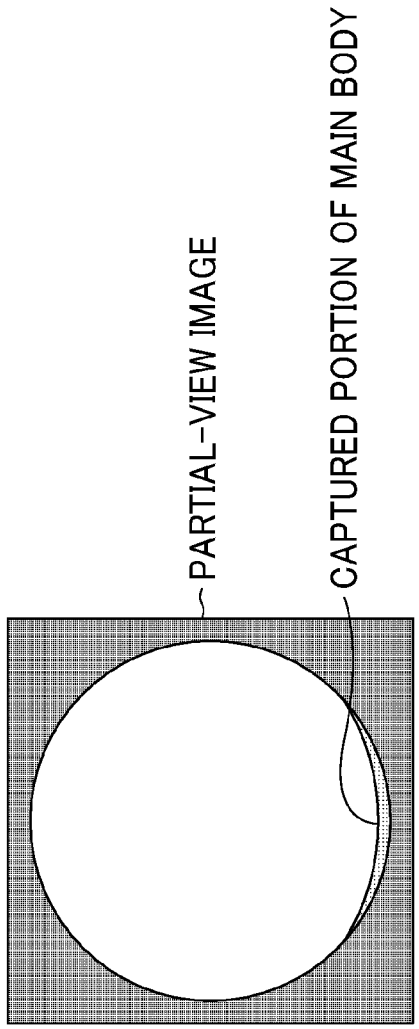
FIGS. 8A and 8B (FIG. 8) are illustrations for describing the difference in the parameter for detecting joining positions between a main-body displaying mode and a main-body hiding mode.

The difference between the main-body displaying parameter 337 and the main-body hiding parameter 338 is described with reference to FIGS. 8A and 8B. FIG. 8A is an illustration of a partial-view image captured by one fish-eye lens of the spherical-image camera 110. The casing 14 of the main the spherical-image camera 110 body is partly reflected in the lower part of the partial-view image in FIG. 8A, which is referred to also as a main-body reflected area. Such circumstances are more likely to occur when the capturing range of the fish-eye lens used exceeds a hemisphere (180 degrees). With such a lens, it is difficult to prevent a part of the casing 14 from being reflected in a partial-view image no matter what subject is captured.

Figure 8B:
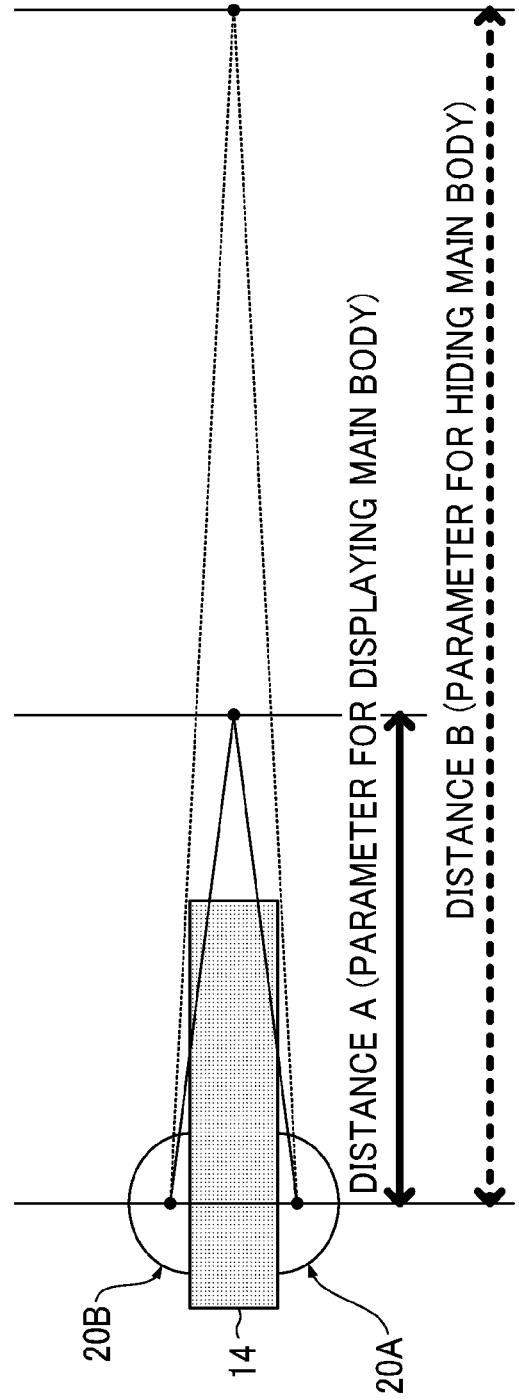

FIG. 8B is an illustration for describing the difference in how the casing 14 is reflected in a partial image with a change in the joining position along the longitudinal direction of the casing 14 where the main-body reflected area is generated in the partial-view image. When the joining position is set at the short focal length that is the distance A from the two image-forming optical systems 20A and 20B, the casing 14 is partially included within the angle of view of each of the image-forming optical systems 20A and 20B as indicated by solid line in FIG. 8B. Accordingly, the casing 14 is partially reflected in a combined image formed by joining two partial-view images.

In particular, when the grip portion G of the spherical-image camera 110 has a vertically long shape, the undesired reflection of a casing in a partial-view image is more likely to occur as illustrated in FIG. 8B. When the joining position is set at a long focal length that is the distance B from the two image-forming optical systems 20A and 20B, the casing 14 is not included within the angle of view of each of the mage-forming optical systems 20A and 20B as indicated by dotted lines in FIG. 8B. Accordingly, the casing 14 is not reflected in a combined image formed by joining two partial-view images.

In other words, by selecting between the main-body displaying parameter 337 and the main-body hiding parameter 338 to change the distance to the joining position so as to deal with the main-body reflected area where the casing is reflected, whether the main body (the casing 14) is reflected in a combined image formed by joining the two partial images can be changed.

The main-body hiding parameter 338 is a mode in which the focal length at the joining position is at least partially longer than the focal length at the joining position in the main-body displaying parameter 337. More specifically, the main-body hiding parameter 338 includes the same focal length at the joining position for another area other than the area where the main body is reflected, and includes a different focal length at the joining position than the focal length at the joining position in the main-body displaying parameter 337. Preferably, for the area where the main body is reflected, the focal length at the joining position in the main-body hiding mode is longer than the focal length at the joining position in the main-body displaying mode. By, for the area other than the area the main body is reflected, setting the same focal length in the main-body hiding parameter 338 as in the main-body displaying parameter 337, the joining position is accurately detected for the area other than the area where the main body is reflected in the pattern matching process in the subsequent stage.

In the embodiment described in the present disclosure, the parameters 337 and 338 may be provided as a transformation table for transforming a partial-view image expressed by the planar coordinate system into an image expressed by the spherical coordinate system for each fish-eye lens, as illustrated in FIGS. 7A and 7B. In the case of using the transformation table as illustrated in FIGS. 7A and 7B, more specifically, the main-body hiding parameter 338 includes the range of the coordinate values after transformation (post-transformation coordinate values) that are associated with the coordinate values before transformation (pre-transformation coordinate values) corresponding to the main-body partially reflected area and the surrounding area thereof in the case of the main-body displaying parameter 337 and the values that are associated with the pre-transformation coordinate values of the shifted positions outside the main-body reflected area in the partial-view image.

In another embodiment, instead of or in addition to the transformation table, a set of the optical data of each fish-eye lens and the distance to the joining position (for both the main-body reflected area and the other area where the main body is not reflected) is stored as the parameters 337 and 338, and the transformation table is calculated from the stored data. Further, in order to differently deal with the area where the main body (casing 14) is reflected, in the transformation table, the same data is shared by the main-body displaying mode and the main-body hiding mode for the area where the main body is not reflected in the main-body displaying parameter 337, and the different data is stored to be used for the area where the main body is reflected. Accordingly, the capacity needed for storing information can be reduced.

The above description is given under the assumption that the distance to the joining position changes between the main-body reflected area and the area outside the main-body reflected area. In order to prevent an abrupt change in the distance to the joining position, for example, it is desired that the distance to the joining position be gradually changed within a prescribed range that includes the main-body reflected area. This configuration provides a natural image in which the viewer might feel less awkward about the boundary between the main-body reflected area and the other area outside the main-body reflected area.

Figure 9:
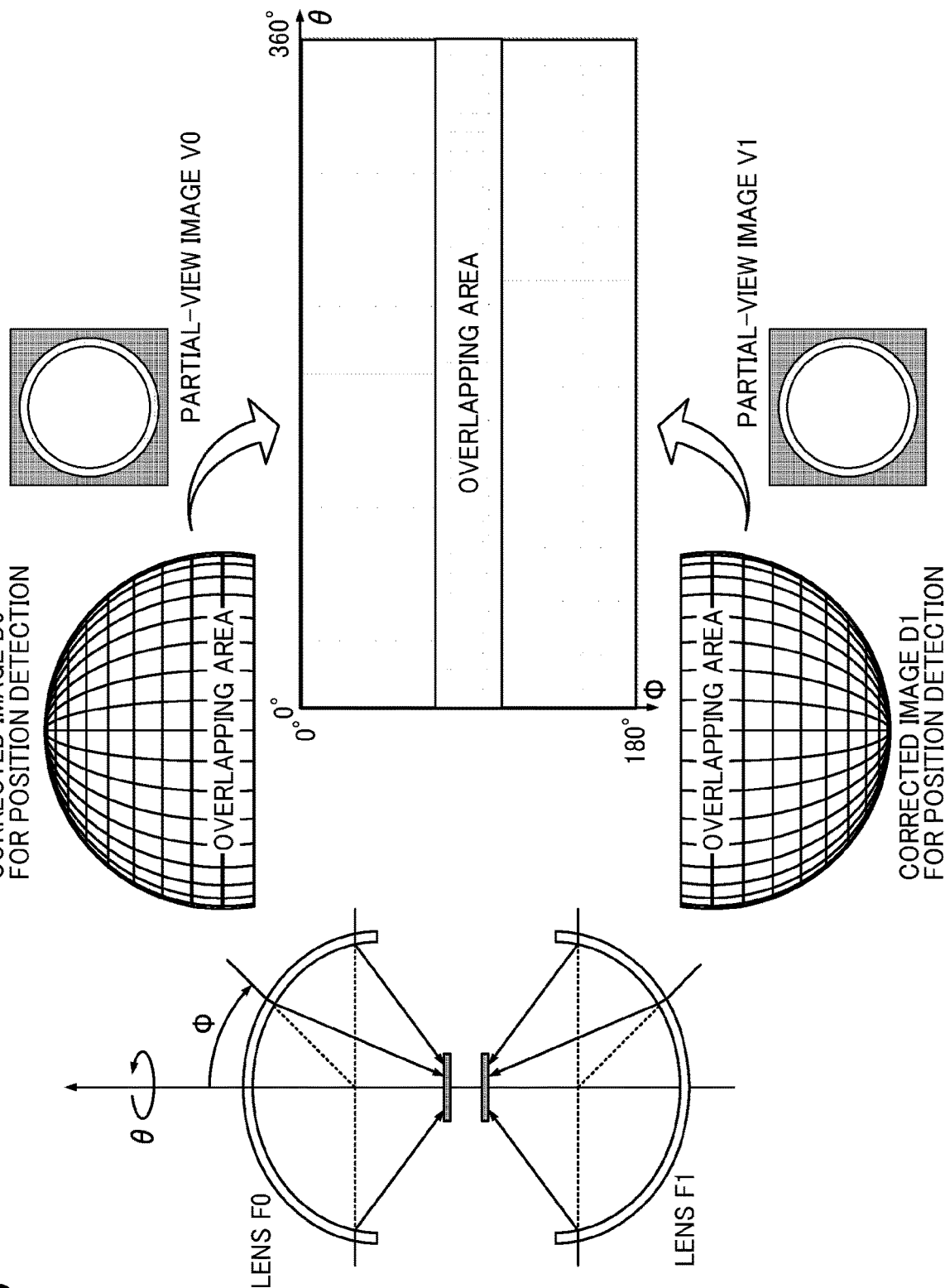
FIG. 9 is an illustration of the mapping of partial-view images captured by two fish-eye lenses on the spherical coordinate system in the position-detecting process of detection positions according to an embodiment of the present disclosure.

FIG. 9 is an illustration of the mapping of partial-view images captured by two fish-eye lenses on the spherical coordinate system in the position-detecting process of detection positions according to an embodiment of the present disclosure. As the result of the process performed by the position-detecting distortion correction unit 302, as illustrated in FIG. 9, the two partial-view images V0 and V1 that are captured by the fish-eye lenses are developed in a spherical image format.

Typically, the partial-view image V0 that is captured by the fish-eye lens F0 is approximately mapped on an upper hemisphere of the whole sphere, and the partial-view image V1 that is captured by the fish-eye lens F1 is approximately mapped on a lower hemisphere of the whole sphere. As the full angles of view of the fish-eye lenses exceed 180 degrees, each of the corrected image C1 and the corrected image C1 that are expressed in a spherical-image format lies off the hemisphere. For this reason, when the corrected image C1 and the corrected image C1 are superimposed on top of one another, an overlapping area occurs in which the captured ranges of these two images overlap with each other.

The joining position detection unit 304 performs pattern matching to detect the joining position between the corrected image C1 and corrected image C1 upon receiving the corrected image C1 and corrected image C1 transformed by the position-detecting distortion correction unit 302, and generates a joining-position detection result 332. The position-detecting transformation table 330 according to the present embodiment is generated such that, as illustrated in FIG. 9, the optical axes of the two lens optical systems are projected onto the two poles of the spherical surface and the overlapping area between the two images is projected near the equator of the spherical surface.

In the spherical coordinate system, the distortion increases as the coordinates become closer to the pole where the vertical angle $\varphi$ is 0 degree or 180 degrees, and the accuracy of the joining position detection deteriorates. By contrast, in the present embodiment where the projection is controlled as described above, the accuracy of the joining position detection can be improved. FIG. 9 is an illustration of how the two partial-view images that are captured by two fish-eye lenses are mapped on a spherical coordinate system, according to the present embodiment. In some embodiments, three or more fish-eye lenses may be used.

Figure 10:
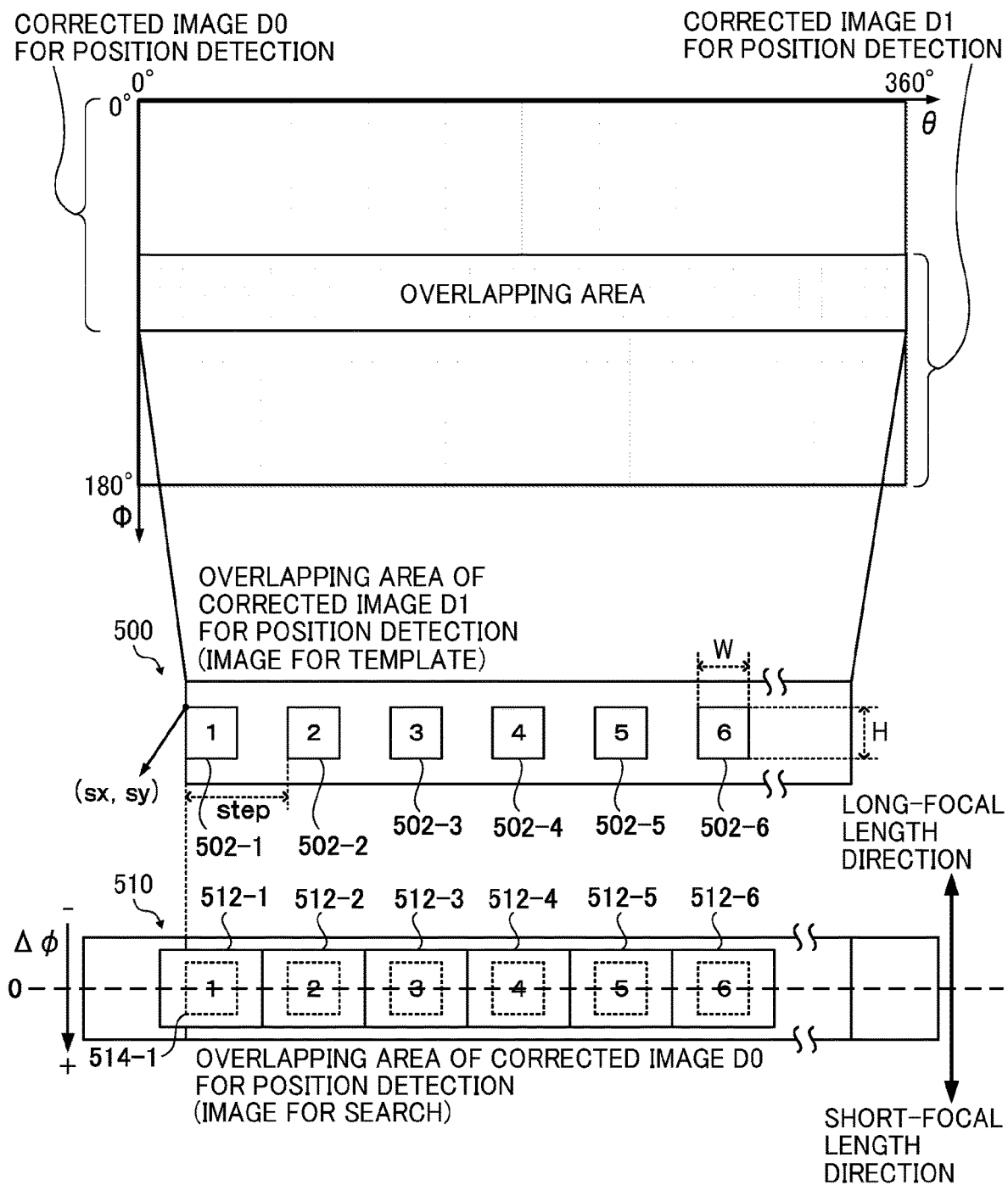
FIG. 10 is an illustration of a method of generating a template image performed by a template generation unit, according to an embodiment of the present disclosure.

FIG. 10 is an illustration of a process of detecting a joining position according to an embodiment of the present disclosure. In the following embodiment, a template image 500 corresponds to an image of the overlapping area of the corrected image C1 for position detection, and an image 510 for search corresponds to an image of the overlapping area of the corrected image C1 for position detection. Here, it is assumed that template images are generated with a prescribed size W and at prescribed intervals (steps), and as illustrated in FIG. 10, a plurality of template images 502-1 to 502-# are generated.

Then, template matching is performed on the generated template images 502-1 to 502-# to search a prescribed search area 512 for corresponding portions 514 on the image 510 for search. For each of the template images 502-1 to 502-#, the amount of the shift from a reference position at a position where the matching score becomes maximum is detected.

For the area other than the area where the main body is reflected in the captured partial-view images, the template matching is performed as illustrated in FIG. 10 to detect the joining position, and the joining process is performed according to the detected joining position. By contrast, for the area where the main-body is reflected (the main-body reflected area), the template matching as illustrated in FIG. 10 may be performed or the joining position may be fixed to a position as set in the position-detecting transformation table 330 without performing the template matching. Further, if the template matching is performed in the main-body hiding mode, the main body might be reflected in an image according to the template-matching result.

For this reason, in the template matching, a search is performed in a direction (long-focal length direction) in which the focal length increases with respect to the joining position set in the position-detecting transformation table 330 within a limited search area. Accordingly, a main body can be prevented from being reflected in an image. In this case, when template matching is not performed by searching in the long-focal length direction, the joining position set in the position-detecting transformation table 330 may be determined as the joining position detection result. This configuration can improve the accuracy of joining of two partial-view images while preventing the main body from reflected in an image in the main-body hiding mode.

The long-focal length direction is the direction in which the template image 500 is searched toward 0 degree of $\varphi$ on the image 510 for search when the template image 500 is created with the corrected image C1 for position detection and the image 510 for search is created with the corrected image C1 for position detection. By contrast, the long-focal length direction is the direction in which the template image 500 is searched toward 180 degrees of $\varphi$ on the image 510 for search when the template image 500 is created with the corrected image C0 for position detection and the image 510 for search is created with the corrected image C1 for position detection.

In FIG. 10, the position at which $\Delta\varphi$ is 0 ($\Delta\varphi=0$) indicates the joining position set in the position-detecting transformation table 330. In the main-body hiding mode, the main body is not reflected in an image at that position. When the joining position is determined by performing the search in the long-focal length direction (in a negative direction from the position of $\Delta\varphi=0$), the main body is not reflected in an image. However, when the joining position is determined by performing the search in the short-focal length direction (in a positive direction from the position of $\Delta\varphi=0$), the main body might be reflected in an image. Hence, it is desired that the template matching be performed such that the search is performed in the long-focal length direction with respect to the joining position set in the position-detecting transformation table 330 within a limited search area.

FIG. 11 is a table of a data structure of a joining position detection result according to an embodiment of the present disclosure. As illustrated in FIG. 11, data in which the post-transformation coordinate values (θ, φ) associated with the amounts of shift (Δθ, Δφ) are listed for all the coordinate values is generated based on the joining position detection process. In so doing, the amount of shift (Δθi, Δφi) for each template block, which is calculated in the joining position detection as described above, is set as the values of the center coordinates of the template block, and the amount of shift (Δθ, Δφ) that corresponds to each of the coordinate values (θ, φ) is interpolated. Accordingly, joining-position data is obtained.

The table correction unit 306 corrects the prepared position-detecting transformation table 330 based on the joining-position detection result 332, and passes the corrected position-detecting transformation table 330 to the table generation unit 308. The position-detecting transformation table 330 is one corresponding to a parameter selected between the main-body displaying parameter 337 and the main-body hiding parameter 338. Due to the joining position detection as described above, as illustrated in FIG. 11, the amount of shift is obtained for each of the coordinate values in a spherical image format. Accordingly, the table correction unit 306 makes a correction such that, in a for-detection distortion-correction table 0 used to correct the distortion on the partial-view image V0, the input coordinate values (θ, φ) are associated with the coordinate values (x, y) that were associated with the coordinate values (θ+Δθ, φ+Δφ) before the correction. Note that in a for-detection distortion-correction table 1 used to correct the distortion on the partial-view image V1, it is not necessary to make a correction to change the associating relation.

The table generation unit 308 generates an image-combining transformation table 336 according to the rotational coordinate transformation and the post-transformation data corrected by the table correction unit 306. In so doing, the table generation unit 308 can generate the image-combining transformation table 336 in view of the inclination correction based on the inclination detection result 334 generated by the inclination detection unit 310.

As described above, the joining position is detected for each frame, and the image-combining transformation table 336 is updated. The processes that are performed by the position-detecting distortion correction unit 302, the joining position detection unit 304, the table correction unit 306, and the table generation unit 308 correspond to the joining position detection process 240 depicted in FIG. 3, and the process that is performed by the inclination detection unit 310 corresponds to the inclination detection process 250. The generated image-combining transformation table 336 corresponds to the joining parameter 260.

As a preliminary process prior to the image-combining process, the image-combining distortion correction unit 312 performs distortion correction on the partial-view image V0 and the partial-view image V1 using the transformation table, and generates a corrected image C0 for combining images and a corrected image C1 for combining images. In a similar manner to the corrected image for position detection, the generated corrected image C1 for combining images and corrected image C1 for combining images are expressed as a spherical coordinate system, but the definition of the coordinate axis in the generated corrected image C1 for combining images and corrected image C1 for combining images is different from that of the corrected image for position detection due to the rotational coordinate transformation. The image combining unit 314 combines the obtained corrected image C1 for combining images and corrected image C1 for combining images to generate a frame for the combined image in a spherical image format.

Figure 12:
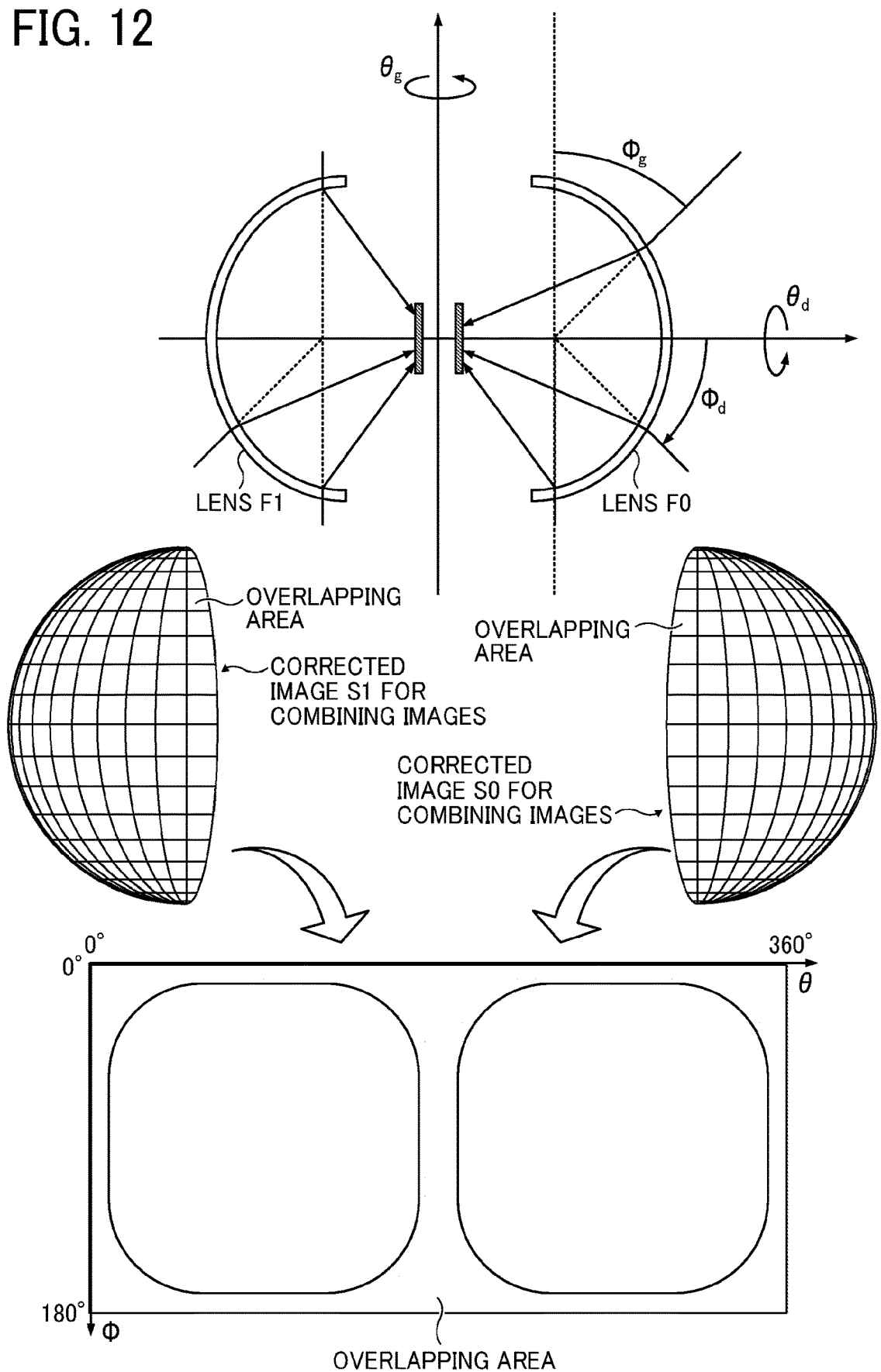
FIG. 12 is an illustration of the mapping of the partial-view images captured by fish-eye lenses on the spherical coordinate system in the image-combining process, according to an embodiment of the present disclosure.

FIG. 12 is an illustration of the mapping of the partial-view images captured by fish-eye lenses on the spherical coordinate system in the image-combining process, according to the present embodiment. Due to the rotational coordinate transformation as described above, the definition of the coordinates of the horizontal angle and vertical angle with reference to the optical axis of one of the lens optical systems, as illustrated in FIG. 9, is transformed into the definition of the coordinates of the horizontal angle and vertical angle with reference to the axis perpendicular to the optical system, as illustrated in FIG. 12. Accordingly, as a result of the process performed by the image-combining distortion correction unit 312, as illustrated in FIG. 12, the two partial-view images V0 and V1 that are captured by the fish-eye lenses are developed in a spherical image format.

Typically, the partial-view image V0 that is captured by the fish-eye lens F0 is approximately mapped on a left hemisphere of the whole sphere, and the partial-view image V1 that is captured by the fish-eye lens F1 is approximately mapped on a right hemisphere of the whole sphere. In FIG. 12, the two partial-view images that are captured by the two fish-eye lenses are mapped on the spherical coordinate system. However, no limitation is indicated thereby, and three or more fish-eye lenses may be used to combine three or more partial-view images to generate a spherical image.

Accordingly, as a result of the process performed by the image-combining distortion correction unit 312, as illustrated in FIG. 12, the corrected images are developed in a spherical image format such that the corrected image C1 for combining images that is captured by the fish-eye lens F0 is arranged on the right, and the corrected image C1 for combining images that is captured by the fish-eye lens F1 is arranged on the left. However, no limitation is intended thereby. In another embodiment, the corrected image C1 for combining images that is captured by the fish-eye lens F0 may be on the left. In still another embodiment, the corrected image C1 for combining images is arranged in the center, one of two parts, into which the corrected image C1 for combining images is separated, is arranged at one side of the corrected image C1 for combining images, and the other part is arranged at the other side of the corrected image C0 for combining images. Alternatively, the corrected image C1 for combining images may be arranged in the center, and the separated parts of the corrected image C1 for combining images are arranged on the sides of corrected image C1, respectively. FIG. 12 is an illustration of the case in which the zenith correction is not performed on the spherical image format. When the zenith correction is performed on the spherical image format, the rotation is added according to the inclination detection result 334 generated by the inclination detection unit 310 in the rotation coordinate transformation for transforming the definition of the horizontal angle and the vertical angle with reference to the axis perpendicular to the optical axis.

Further, the image-combining transformation table 336 that is updated in the joining position detection process is referred to, for each frame.

The image processing block 300 illustrated in FIG. 4 may further include a monitor-image generation unit 322. The combined image generated as above is expressed in a spherical image format. For this reason, if such a combined image is displayed on a planar display device such as a display just as is, the distortion increases as the coordinate becomes closer to the pole where the vertical angle φ is 0 degree or 180 degrees, and the accuracy of the joining position detection deteriorates. For the purpose of checking angle of view, it does not matter even if the image is displayed in a spherical image format. However, in a desirable embodiment, image processing can be performed on the spherical image so as to be optimized for the projection on a planar display device.

The monitor-image generation unit 322 modifies a combined image in a spherical image format such that the spherical coordinate system is sequentially transformed into a planar coordinate system of a specific direction and angle of view, and projects the modified image on a frame of such a specific field-of-view direction and angle of view selected by the user. Accordingly, an image that simulates a specific point of view and field of view can be monitored by the viewer.

In the above description, the display of a monitor image when it is ready to capture such a still image or video or when such a still image or video is being captured is described. Alternatively, a still image of the spherical image generated in the image processing path as described above may be generated and stored, or video (moving image) of a series of images consisting of a plurality of frames of the spherical image may be generated upon compression and stored.

The image data storing unit 320 stores a still image or a moving image as image data. In the case of a still image, the still image compression block 119 in FIG. 2A compresses the image data to a still image format such as JPEG or TIFF. In the case of a moving image, the moving image compression block 118 compresses the image data to a moving image format such as MPEG-4AVC/H.H.264. The generated image data is stored in a storage area such as the external memory 134.

It is desired that the image data be stored in association with the type of mode at which the joining process has been performed so that the user can identify the selected mode later. For example, a still image may be recorded using an existing metadata format such as exchangeable image file format (EXIF) or TIFF, and a moving image may be stored using an existing container format such as MP4. Alternatively, a metadata format peculiar to the user may be created. This facilitates selection of image data according to the intended use. Further, parameters such as the transformation table and the optical data that have been used in the joining process may be stored in the metadata of the image data together with or instead of the type of the selected mode.

In some examples, the image data (intermediate image data) on which the image processing, particularly the joining process, is not performed by the image processing block 116 is output from an output unit (the storage interface 122) and stored as a file in a format in which the data is output from the image sensor 130 as is, which is referred to as the raw data in general. As such raw data is not subjected to the joining process in the spherical-image camera 110, the joining process is performed on the raw data at another device, such as the user terminal device 150, other than the spherical-image camera 110. In order to change the mode for the joining process in the device other than (outside) the spherical-image camera 110, the output unit stores, in the metadata of the raw data, the transformation table and the optical data for each mode. For the raw data, existing metadata formats such as digital negative (DNG) can be used. In the device (for example, the user terminal device 150) other than the spherical-image camera 110, the same joining process as in the spherical-image camera 110 is performed by executing the application that performs the same joining processing method as in the spherical-image camera 110 (the application that implements the above-described position-detecting distortion correction unit 302, joining position detection unit 304, table correction unit 306, table generation unit 308, image-combining distortion correction unit 312, image combining unit 314, mode selection unit 318, and parameter switching unit 319, which constitute a joining processing unit), using the transformation table and the optical data for each of the two modes stored in the metadata of the raw data.

Figure 13:
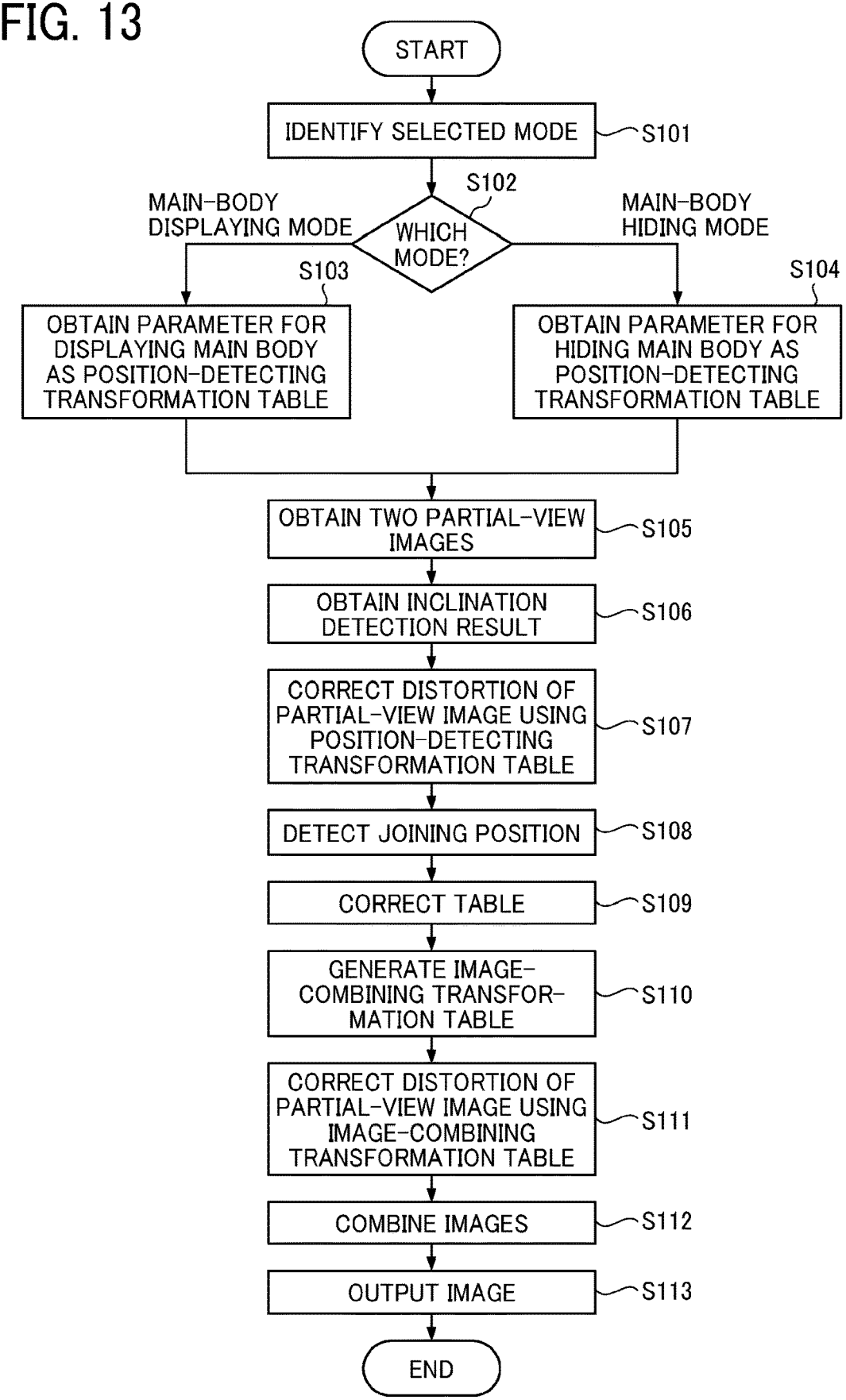
FIG. 13 is a flowchart of a spherical-image combining process according to a mode, which is performed by the spherical-image capturing system according to an embodiment of the present disclosure.

The spherical-image combining process is described below in detail according to the present embodiment, with reference to FIG. 13. Note that the spherical-image combining process in FIG. 13 corresponds to the case where a spherical still image is captured. Further, the spherical-image combining process in FIG. 13 is described assuming that the spherical-image camera 110 performs each process. More specifically, the CPU 112 and other hardware blocks such as the image processing block 116 including the ISP and the still image compression block 119 of the spherical-image camera 110 execute the processes in FIG. 13.

The spherical-image combining process in FIG. 13 is started, for example, upon detecting that the user has pressed the shooting button 18. In step S101, the spherical-image camera 110 refers to the setting value set for itself, and identifies whether the selected mode is the main-body displaying mode or the main-body hiding mode. In step S102, the process branches depending on the identified selected mode. In other words, the spherical-image camera 110 determines whether the mode at which the following processes are performed is main-body displaying mode or the main-body hiding mode based on the identified selected mode. If it is determined that the mode is the main-body displaying mode, the process proceeds to step S103, and the spherical-image camera 110 obtains the main-body displaying parameter 337 as the position-detecting transformation table 330. If it is determined that the mode is the main-body hiding mode, the process proceeds to step S104, and the spherical-image camera 110 obtains the main-body hiding parameter 338 as the position-detecting transformation table 330.

In step S105, the spherical-image camera 110 controls the two image sensors 130A and 130B in FIG. 2A to acquire two partial-view images. When three or more fish-eye lenses are used, three or more partial-view images are obtained. In step S106, the spherical-image camera 110 controls the sensor 136 in FIG. 2A to detect the inclination of the spherical-image camera 110 relative to a prescribed reference direction and obtains an inclination detection result. Note that, although the description is made in order of step S105 and step S106, the order is not limited, and the inclination detection may be performed first or the process in step S105 and the process in S106 may be performed simultaneously.

In step S107, the spherical-image camera 110 correct the distortion of the partial-view image using the position-detecting transformation table 330 obtained in step S103 or step S104, and obtains two corrected images for position detection. When three or more fish-eye lenses are used, three or more corrected images for position detection are obtained.

In step S108, the spherical-image camera 110 detects a joining position between the two corrected images for position detection through, for example, pattern matching and obtains a joining-position detection result 332. When three or more fish-eye lenses are used, a joining position between the corrected images is detected for each combination of two images that overlap each other among the three or more corrected images for position detection.

In step S109, the spherical-image camera 110 corrects the position-detecting transformation table 330 based on the joining-position detection result 332. In step S110, the spherical-image camera 110 generates an image-combining transformation table 336 by appropriately incorporating the inclination detection result 334 obtained in step S106 (the inclination detection result 334 generated by the inclination detection unit 310) into the corrected transformation data based on the rotation coordinate transformation.

In step S111, the spherical-image camera 110 corrects the distortion of the partial-view images obtained in step S105 using the image-combining transformation table 336, and obtains two corrected images for combining images. When three or more fish-eye lenses are used, three or more corrected images for combining images are obtained. In step S112, the spherical-image camera 110 combines the obtained two corrected images for combining images and generates a spherical image. During the combining of the corrected images, a process, such as blending, is appropriately performed in the overlapping area of the corrected images for combining images. In step S113, the spherical-image camera 110 outputs the generated spherical image to a device, such as a recording medium or a monitor, in an appropriate format such as JPEG, and ends the process.

In the above description, the spherical-image combining process is described with an example case where a spherical still image is captured, referring to FIG. 13. In the case of interval shooting or time-lapse shooting where a moving image or plural continuous still images are captured, the processes step S105 to step S113 are repeated for each frame of a moving image or for each still image.

In the above description, the spherical-image combining process is described with reference to FIG. 13, assuming that the spherical-image camera 110 captures partial-view images of a spherical image and combines the partial-view images to generate a spherical image. However, in some examples, the user terminal device 150 performs the spherical-image combining process based on image data after the shooting, and the same flowchart in FIG. 13 applies to such examples as well. In this case, in step S101, the user terminal device 150 identifies the selected mode by reading the metadata of the image data or receives the mode selected by the user on the application.

In step S105, the user terminal device 150 obtains two partial-view images by reading the image data in a dual-fisheye form in which fish-eye images are arranged side by side. In step S106, the user terminal device 150 obtains the inclination detection result by reading the metadata of the image data. For the main-body displaying parameter 337 and the main-body hiding parameter 338 to be obtained in step S103 and step S104, the user terminal device 150 obtains the main-body displaying parameter 337 and the main-body hiding parameter 338 from the metadata or the like of the image data.

These processes are executed by the CPU 152 and other hardware blocks including a hardware accelerator of the user terminal device 150. Further, the spherical-image camera 110 establish a collaborative relationship with the user terminal device 150 to capture partial-view images and combine the partial-view images to generate a spherical image. In this case, the processes from capturing images to combining the images to generate a spherical image are shared by the spherical-image camera 110 and the user terminal device 150 as desired.

Figure 14A:
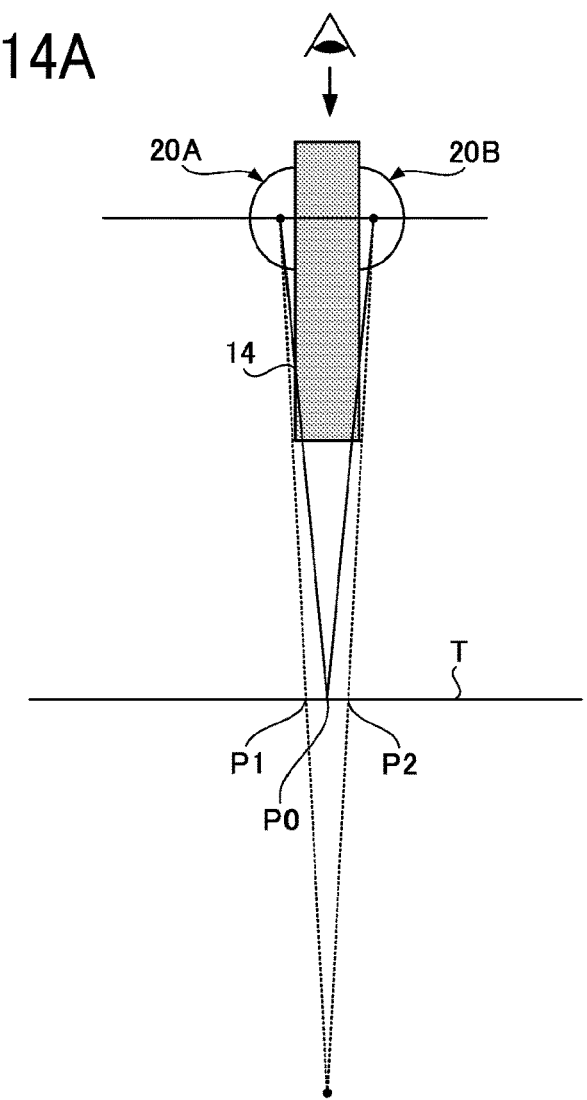
FIGS. 14A, 14B, and 14C (FIG. 14) are illustrations for describing the difference in a generated image between the main-body displaying mode and the main-body hiding mode in the spherical-image capturing system according to an embodiment of the present disclosure.
Figure 14B:
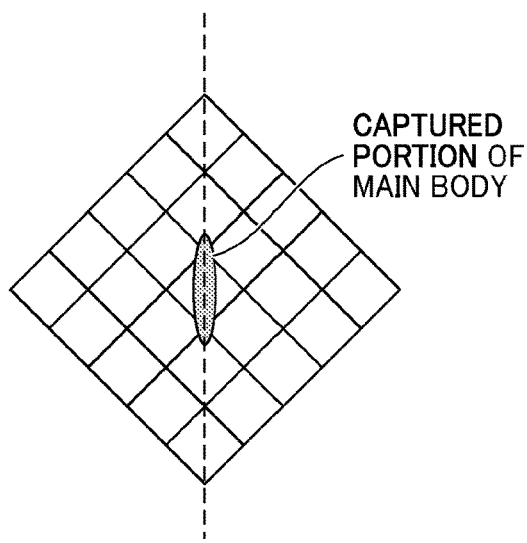
Figure 14C:
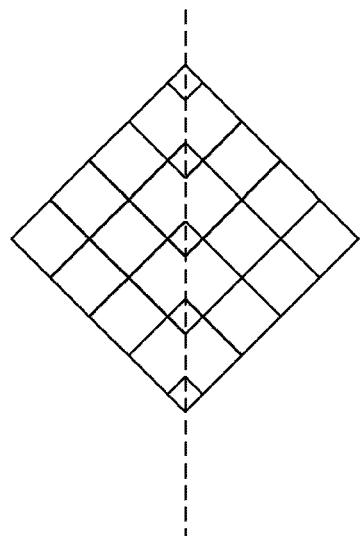

The following describes the difference between an image generated in the main-body displaying mode and an image generated in the main-body displaying mode, with referred to simply as FIGS. 14A, 14B, and 14C. FIG. 14A indicates a viewpoint direction when an image in the spherical image format captured in each mode is mapped on the spherical coordinates. The line of sight is directed toward the floor from above the spherical-image camera 110. In the example of FIGS. 14A, 14B, and 14C, it is assumed that the floor surface T has a lattice pattern.

In the main-body displaying mode, the joining position detection is performed to detect the joining position for joining two partial-view images by determining a point P0, which is equidistant from the two image-forming optical systems 20A and 20B, on the floor surface T. In the main-body hiding mode, the joining position for joining two partial-view images is determined by points P1 and P2 of intersection of the floor surface T and the lines forming the incident angle as indicated by dotted lines at which the main body is not reflected in the partial-view images.

FIG. 14B is an illustration of an image captured in the main-body displaying mode, and FIG. 14C is an illustration of an image captured in the main-body hiding mode. In FIGS. 14B and 14C, two partial-view images are joined at the joining position indicated by dotted lines. In the main-body displaying mode as illustrated in FIG. 14B, the area where the main body is reflected occurs in a captured image (a spherical image) while the grid patterns of the floor surface T are joined with a high degree of precision.

As described above, the main-body displaying mode provides a spherical image in which the casing 14 of the spherical-image camera 110 is at least partly reflected, through the joining process that joins a plurality of partial-view images in which the casing 14 has been captured. In other words, the main-body displaying mode prioritizes the natural-looking of the joint of the captured partial-view images while allowing the casing 14 to be partly reflected in a spherical image generated in the end.

By contrast, in the main-body hiding mode as illustrated in FIG. 14C, the area where the main body of the spherical-image camera 110 itself is reflected in a spherical image is minimized and is preferably eliminated. However, as the partial-view images are partially eliminated from the joint portion to eliminate the area where the main body is reflected in a spherical image, the grid pattern of the floor surface T is not slightly consistent with the original pattern of the floor surface T. As described above, the main-body hiding mode (the second mode) provides a spherical image whose area where the casing 14 of the spherical-image camera 110 is reflected is smaller than the main-body displaying mode (the first mode) does or provides a spherical image in which the casing 14 is not substantially reflected, through the joining process that joins a plurality of partial-view images in which the casing 14 has been captured. In this case, the meanings of the phrase "the casing 14 is not substantially reflected" include the case in which the casing 14 is reflected in a spherical image within the range that does not affect the overall image quality, for example, for several pixels. In other words, the main-body hiding mode prevents the casing 14 from being partly reflected in a spherical image as much as possible while allowing an unnatural looking of the joint portion at an area where the casing 14 is possibly reflected and the surrounding area of the area where the casing 14 is possibly reflected.

In FIG. 14C regarding the main-body hiding mode, for convenience of description, the patterns of the floor surface T are drawn to be discontinuous between the two partial-view images. However, it is desired that the joining process be changed in a certain range including the area where the casing is reflected. More precisely, in FIG. 14C, the patterns of the floor surface T gradually become continuous between the partial-view images in a direction away from the main body along the up-to-down direction of the spherical-image camera 110. In other words, even in the main-body hiding mode, the same joining process as in the main-body displaying mode is performed in an area away from the area where the casing 14 is possibly reflected in the partial-view images.

As described above, when it is desired to properly connect the subject that is reflected in a spherical image between the captured images while failing to prevent the main body from being reflected in a spherical image, the user may select and use the main-body displaying mode. When it is desired to prevent the main body from being reflected in a spherical image, the user may select and use the main-body hiding mode.

The above-described embodiments provide an image processing system, an image capturing system, an image processing device, and image capturing device, and a recording medium, which are capable of minimizing or eliminating the area where the image capturing device is reflected in an image generated by joining a plurality of captured input images, or preventing the image capturing device from being reflected in the generated image.

Particularly, the above-described embodiments provide the main-body hiding mode to prevent a part of the casing of the main body from being reflected in the generated image while permitting an unnatural looking of the joint of the captured input images. The joining process to be performed in the area where the casing of the main body is at least partially reflected in the captured input images is changed according to the selected mode. For this reason, the user can select, for an output image, between the mode in which the main body of the image capturing device is reflected in the output image and the mode in which the main body is prevented from being reflected in the output image. In particular, in the spherical-image camera 110 provided with a grip portion having a vertically long shape, as the main body of the spherical-image camera 110 is more likely to be reflected in a spherical image as illustrated in FIG. 8B, the main-body hiding mode is useful.

For example, the main-body hiding mode is effective during the shooting of landscape. When shooting in the nature where the spatial frequency is high, although an natural looking remains to some extent in a generated spherical image, a higher-quality image of the landscape is obtained by preventing a part of the casing of the main body from being reflected in the spherical image. As the spatial frequency is high particularly in the nature outside, the regular grid pattern as illustrated in FIG. 14B rarely exists in such nature. For this reason, even if the joint portion looks unnatural, the generated image as a whole is unlikely to look unnatural for the user. Thus, the main-body hiding mode is effective in the image capturing scene in which the joint portion is unlikely to look unnatural.

In the above-described embodiments, the spherical-image capturing system 100 including the spherical-image camera 110 and the user terminal device 150 communicably connected with the spherical-image camera 110 are described as an example of the image processing system and the image capturing system.

In the spherical-image capturing system 100 described above, in a specific embodiment, the hardware of the spherical-image camera 110 implements the selection process 210, the parameter switching process 220, the partial-view image acquisition process 230, the joining position detection process 240, the inclination detection process 250, the joining process 270, and the data output process 280, and the user terminal device 150 performs monitor display. In this embodiment, the spherical-image camera 110 outputs an output image according to the selected mode to the user terminal device 150, and the user terminal device 150 displays a monitor image based on the output image according to the mode. Further, the spherical-image camera 110 can store a still image or a moving image according to the selected mode as image data. However, the configurations of the image processing system and the image capturing system are not limited to the configurations described above.

In the above-described embodiment, the user manually selects the mode through the user terminal device 150 or the spherical-image camera 110, and the spherical-image camera 110 receives the mode.

However, in another embodiment, the mode may be automatically selected by identifying the subject that appears in the area where the main body is reflected in a captured image through the recognition of the pattern or the object, based on the information about the subject in the area where the main body is reflected in and the surrounding area of the area. For example, if a distinguishing subject (a floor surface having a regular pattern) exists near the area where the main body is reflected, the main-body displaying mode is automatically selected and the joining process is performed to precisely connect the subject between the captured images. If an undistinguished subject (a floor surface with no pattern, a random pattern, grass, and sand soil) exists near the area where the main body is reflected in a captured image, the main-body hiding mode is automatically selected and the joining process is performed with less accuracy of connecting the subject between the captured images while preventing the main body from being reflected in a spherical image. The spherical-image camera 110 may have such automatic modes and the user's manual main-body displaying mode and main-body hiding mode, which are selectable by the user.

In another embodiment, the spherical-image camera 110 has an automatic mode as a user-selectable mode, instead of the user's manual main-body hiding mode and main-body displaying mode, and has the main-body displaying mode and the main-body hiding mode as the internal mode. In this case, the mode selection unit 318 receives the selected internal mode from the module that determines the subject in the area where the main body is reflected in a captured image and selects the internal mode.

In some other embodiments, all of the image processing including the processes 210 to 280 and the display processing may be implemented on the spherical-image camera 110 side, which means that only the spherical-image camera 110 constitutes the image processing system, the image processing device, and the image capturing system. In still some other embodiments, the image processing including the processes 210 to 280, except for the partial-view image acquisition process 230, and the display processing may be implemented on one or more external image processing devices such as a personal computer or server including the user terminal device 150 in a distributed manner.

For example, in a specific embodiment, the image processing including the processes 220 to 280, except for the partial-view image acquisition process 230, may be implemented on the user terminal device 150 serving as an image processing device. In such an embodiment, the spherical-image camera 110 acquires and outputs a plurality of partial-view images regardless of the mode, and the user terminal device 150 receives the multiple partial-view images output from the spherical-image camera 110 and generates an output image according to the selected mode to display a monitor image or store the image data.

In the above embodiment, the cases where the casing 14 is reflected in a spherical image is described. The embodiments of the present disclosure are applicable to prevent components to be attached to the spherical-image camera 110, optional items such as a waterproof housing and an external microphone), and fixing instruments such as a monopod and a tripod, from being reflected in a spherical image.

In this case, since an area where a subject other than the casing 14 is reflected is indefinite, such an area is to be identified by causing the user terminal device to display data of combined image captured in the main-body displaying mode, and allowing the user to select the area where a subject other than the casing is reflected. Then, the transformation table as illustrated in FIG. 7A is changed to deal with such an area. If the subject reflected in a spherical image is the option item such as a genuine accessory, the shape of the subject is known to the user and the area where the subject is reflected can be identified. Thus, the transformation table of each mode as illustrated in FIG. 7A can be preliminarily prepared for each option item.

In the embodiments described as above, in the inclination correction, the tilt angle is obtained with reference to the vertical direction. Instead of the direction of gravity, for example, the horizontal direction or another desired direction may be set as a reference direction, and the inclination of the image may be corrected based on the inclination of a prescribed object, such as the spherical-image camera 110 or the image sensor 130A or 130B, with reference to the reference direction. In the above-described embodiment, the acceleration sensor is used for detecting the inclination. However, no limitation is indicated thereby, and another inclination sensor, such as a combination of an acceleration sensor and a geomagnetic sensor, may detect the inclination of, for example, the spherical-image camera 110, the image sensors 130A or 130B attached to the spherical-image camera 110, or the sensor itself.

The functional units as described above is achieved by a computer-executable program written by legacy programming language or object-oriented programming language such as assembler language, C language, C++ language, C# language, and Java (registered trademark), and the program can be distributed via telecommunication line or upon being written on a computer-computer-readable recording medium such as ROM, electrically erasable and programmable read only memory (EEPROM), erasable programmable read only memory (EPROM), flash memory, flexible disk, compact disc read only memory (CD-ROM), compact disc rewritable (CD-RW), digital versatile disk (DVD)-ROM, DVD-RAM, DVD-RW, Blu-ray disc, secure digital (SD) card, and magneto-optical disc (MO). All or some of the functional units described above can be implemented, for example, on a programmable device such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, a hardware description language (HDL), Very High Speed Integrated Circuit Hardware Description Language (VHDL), or Verilog HDL.

Numerous additional modifications and variations are possible in light of the above teachings. It is therefore to be understood that, within the scope of the appended claims, the disclosure of this patent specification may be practiced otherwise than as specifically described herein. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The processing apparatuses can include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

This patent application is based on and claims priority pursuant to Japanese Patent Application No. 2019-111951, filed on Jun. 17, 2019 in the Japan Patent Office, the entire disclosure of which is hereby incorporated by reference herein.

REFERENCE SIGNS LIST

12 Imaging body
14 Casing
18 Shooting button
20 Image-forming optical system
22 Image sensor
100 Spherical-image capturing system
110 Spherical-image camera
112 CPU
114 ROM
116 Image processing block
118 Moving image compression block
119 Still image compression block
120 DRAM interface
122 Storage interface
124 Sensor interface
126 USB interface
128 Serial block
129 Video output interface
130 Image sensor
132 DRAM
134 External memory
136 Sensor
138 USB connector 140 Wireless NIC
142 Bus
150 User terminal device
152 CPU
154 RAM
156 Internal memory (HDD)
158 Input device
160 Removable memory
162 Display
164 Wireless NIC
166 USB connector
168 Bus
200 Image processing
210 Selection process
220 Parameter switching process
230 Partial-view acquisition process
240 Joining position detection process
250 Inclination detection process
260 Joining parameters
270 Joining process
280 Data output process
300 Image processing block
302 Position-detecting distortion correction unit
304 Joining position detection unit
306 Table correction unit
308 Table generation unit
310 Inclination detection unit
312 Image-combining distortion correction unit
314 Image combining unit
318 Mode selection section
319 Parameter switching unit
320 Image data storage unit
322 Monitor image generation unit
330 Position-detecting transformation table
332 Joining-position detection result
334 Inclination detection result
336 Image-combining transformation table
337 Main-body displaying parameter
338 Main-body hiding parameter
500 Template image
502 Template image
510 Image for search
512 Search area
514 Corresponding portion

The invention claimed is:

1. An image processing system, comprising:
joining processing circuitry configured to perform a joining process to join a plurality of input images captured by a camera and generate an output image, the camera being reflected in each of the plurality of input images;
acceptance circuitry configured to receive selection of one of a plurality of modes for the joining process,
correction circuitry configured to correct distortion of the plurality of input images based on respective parameters to obtain a plurality of corrected input images; and
detection circuitry configured to detect a joining position between two of the plurality of corrected input images;
the plurality of modes having:
a first mode to generate an output image in which at least a part of the camera is reflected, through the joining process; and
a second mode to, through the joining process, generate an output image whose area where the camera is reflected is smaller than an area where the camera is reflected in the output image in the first mode or generate an output image in which the camera is not reflected; and the respective parameters for the first mode and the second mode are different so that a focal length at the joining position for joining the plurality of input images in the second mode is at least partly longer than a focal length at the joining position for joining the plurality of images in the first mode, the focal length at the joining position in the first mode being a certain distance.

2. The image processing system according to claim 1,
wherein the output image is stored in association with at least one of the first mode or the second mode used in the joining process and a parameter corresponding to the mode, and
wherein the parameter includes at least one of a transformation table and optical data for the joining process.

3. The image processing system according to claim 1,
further comprising an output circuitry configured to output, as intermediate image data, the plurality of input images that has not been subjected to the joining process, together with a parameter corresponding to the first mode and another parameter corresponding to the second mode,
wherein the joining processing circuitry is configured to read the intermediate image data and obtain the plurality of input images and obtain the parameter corresponding to the first mode or the second mode received by the acceptance circuitry so as to perform the joining process.

4. The image processing system according to claim 1,
wherein the acceptance circuitry is configured to select a mode based on user's operation.

5. The image processing system according to claim 4,
wherein the user's operation is made through a user interface of the camera, a user interface communicably connected with the camera, or a user interface of a terminal communicably connected with the camera.

6. The image processing system according to claim 1,
wherein the acceptance circuitry is configured to receive a mode selected based on information of a subject in an area where the camera is reflected and a surrounding area of the area in the plurality of input images.

7. The image processing system according to claim 1,
wherein the selected mode is kept unchanged under prescribed conditions.

8. The image processing system according to claim 1,
further comprising a detection processing circuitry configured to detect a joining position for joining the plurality of input images,
wherein for an area other than the area where the camera is reflected at least in the plurality of input images, the joining processing circuitry performs the joining process according to the detected joining position.

9. The image processing system according to claim 1,
wherein the plurality of input images is a partial-view image in the planar coordinate system, and the input image is a spherical image in the spherical coordinate system.

10. The image processing system according to claim 1,
wherein the plurality of input images and the output image are a still image or a moving image.

11. An image processing system comprising:
joining processing circuitry configured to perform a joining process to join a plurality of input images and generate an output image; and
acceptance circuitry configured to receive selection of one of a plurality of modes for the joining process, correction circuitry configured to correct distortion of the plurality of input images based on respective parameters to obtain a plurality of corrected input images; and detection circuitry configured to detect a joining position between two of the plurality of corrected input images;

the plurality of modes having a first mode and a second mode, wherein the respective parameters for the first mode and the second mode are different so that a focal length at the joining position for joining the plurality of input images in the second mode is at least partly longer than a focal length at the joining position for joining the plurality of images in the first mode, the focal length at the joining position in the first mode being a certain distance.

12. An image capturing system comprising:

the image processing system according to claim 1;

a plurality of optical systems and image sensors, the plurality of optical systems and the plurality of image sensors configured to capture the plurality of input images.

13. An image processing device comprising:

joining processing circuitry configured to perform a joining process to join a plurality of input images captured by the camera and generate an output image, in each of the plurality of input images, the camera being reflected;

identifying circuitry configured to identify a mode selected from a plurality of modes to be applied to the joining process, correction circuitry configured to correct distortion of the plurality of input images based on respective parameters to obtain a plurality of corrected input images; and detection circuitry configured to detect a joining position between two of the plurality of corrected input images;

the plurality of modes having:

a first mode to generate an output image in which at least a part of the camera is reflected, through the joining process; and a second mode to, through the joining process, generate an output image whose area where the camera is reflected is smaller than an area where the camera is reflected in the first mode or generate an output image in which the camera is not reflected; and the respective parameters for the first mode and the second mode are different so that a focal length at the joining position for joining the plurality of input images in the second mode is at least partly longer than a focal length at the joining position for joining the plurality of images in the first mode, the focal length at the joining position in the first mode being a certain distance.

14. The image processing device according to claim 13, wherein, for an area where at least the camera is reflected in the input images, the joining process changes between the first mode and the second mode.

15. The image processing device according to claim 14, wherein when the joining process changes, the focal length at a joining position is changed such that a focal length at a joining position in the second mode is longer than a focal length at a joining position in the first mode.

16. An image capturing device, comprising:

the image processing device according to claim 13; and a plurality of optical systems and image sensors to capture the plurality of input images to be processed by the image processing device; and wherein in each of the plurality of input images, the camera is reflected.

* * * * *